(12) United States Patent
Minevski et al.

(10) Patent No.: US 8,549,001 B1
(45) Date of Patent: Oct. 1, 2013

(54) METHOD AND SYSTEM FOR GATHERING AND PROVIDING CONSUMER INTELLIGENCE

(71) Applicant: DLZTX, Inc., The Woodlands, TX (US)

(72) Inventors: Zoran Minevski, The Woodlands, TX (US); Diana A. Minevski, The Woodlands, TX (US)

(73) Assignee: DLZTX, Inc., The Woodlands, TX (US)

(*) Notice: Subject to any disclaimer, the term of this patent is extended or adjusted under 35 U.S.C. 154(b) by 0 days.

(21) Appl. No.: 13/840,102

(22) Filed: Mar. 15, 2013

(51) Int. Cl.
*G06F 17/30* (2006.01)

(52) U.S. Cl.
USPC ............................ 707/736; 705/26.1

(58) Field of Classification Search
USPC ................. 707/736; 705/7.26, 26.1
See application file for complete search history.

(56) References Cited

U.S. PATENT DOCUMENTS

| | | | |
|---|---|---|---|
| 2003/0053615 A1* | 3/2003 | Anderson et al. | 379/265.09 |
| 2005/0261980 A1* | 11/2005 | Hadi | 705/26 |
| 2008/0162262 A1 | 7/2008 | Perkins | |
| 2010/0149093 A1 | 6/2010 | Edwards | |
| 2011/0010266 A1* | 1/2011 | Edwards | 705/26.8 |
| 2012/0101966 A1 | 4/2012 | Van Coppenolle et al. | |
| 2012/0215574 A1 | 8/2012 | Driessnack et al. | |

OTHER PUBLICATIONS

Bass,"Intrusion Detection System & Multisensor Data Fusion Creating Cyberspace Situational Awareness", 2000, ACM.*

* cited by examiner

*Primary Examiner* — James Trujillo
*Assistant Examiner* — Dawaune Conyers
(74) *Attorney, Agent, or Firm* — Andrews Kurth LLP

(57) ABSTRACT

A method for gathering and providing consumer intelligence includes the steps of receiving and storing data in a first database relating to a transaction between a consumer and a business enterprise, receiving and storing cognitive data in the first database, wherein at least some of the cognitive data relates to the consumer's emotions during a transaction between the consumer and the business enterprise, receiving and storing data in the first database relating to a transaction between two or more business enterprises, and providing data from the first database to a business enterprise in response to a request for data sent by the business enterprise.

20 Claims, 24 Drawing Sheets

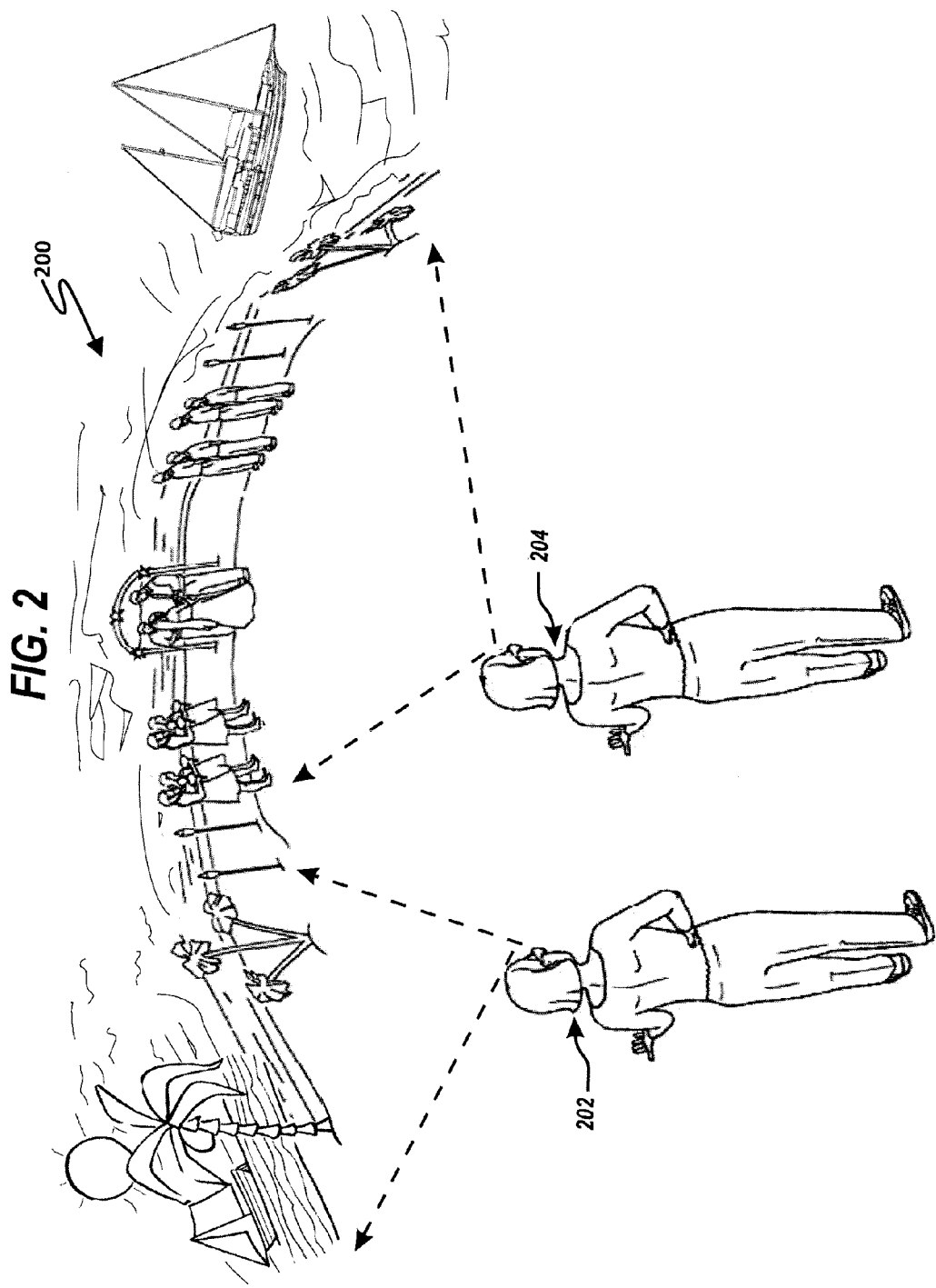

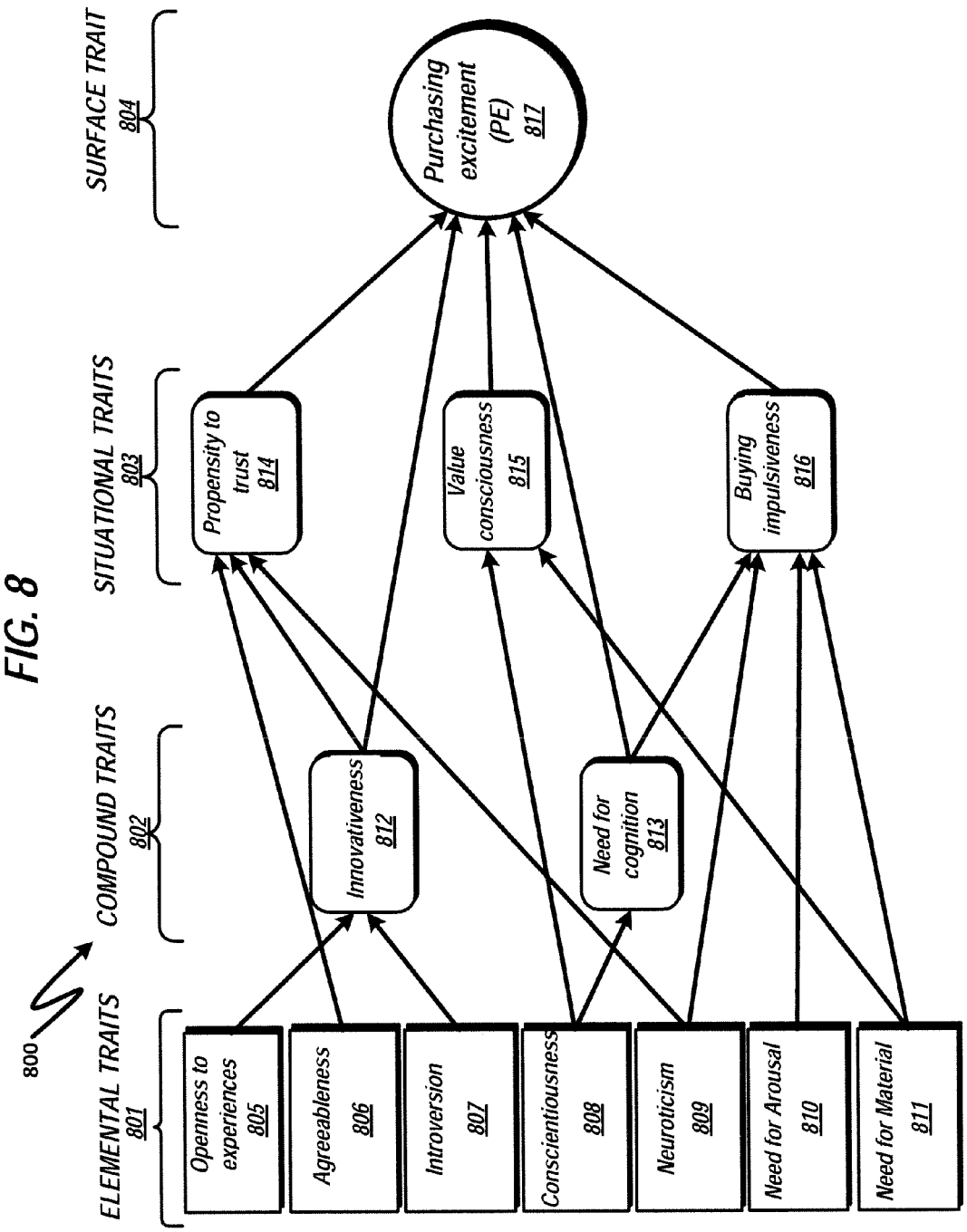

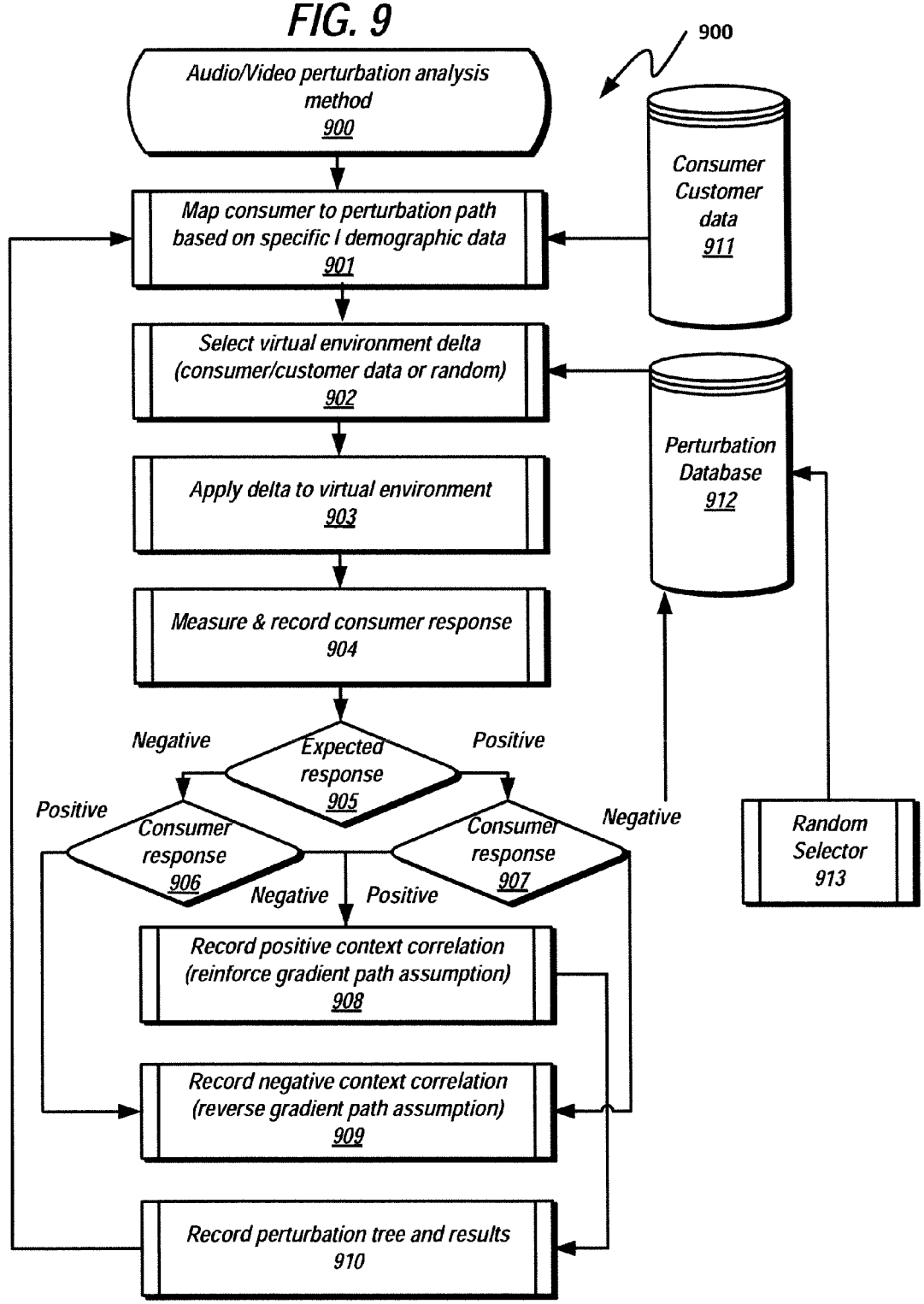

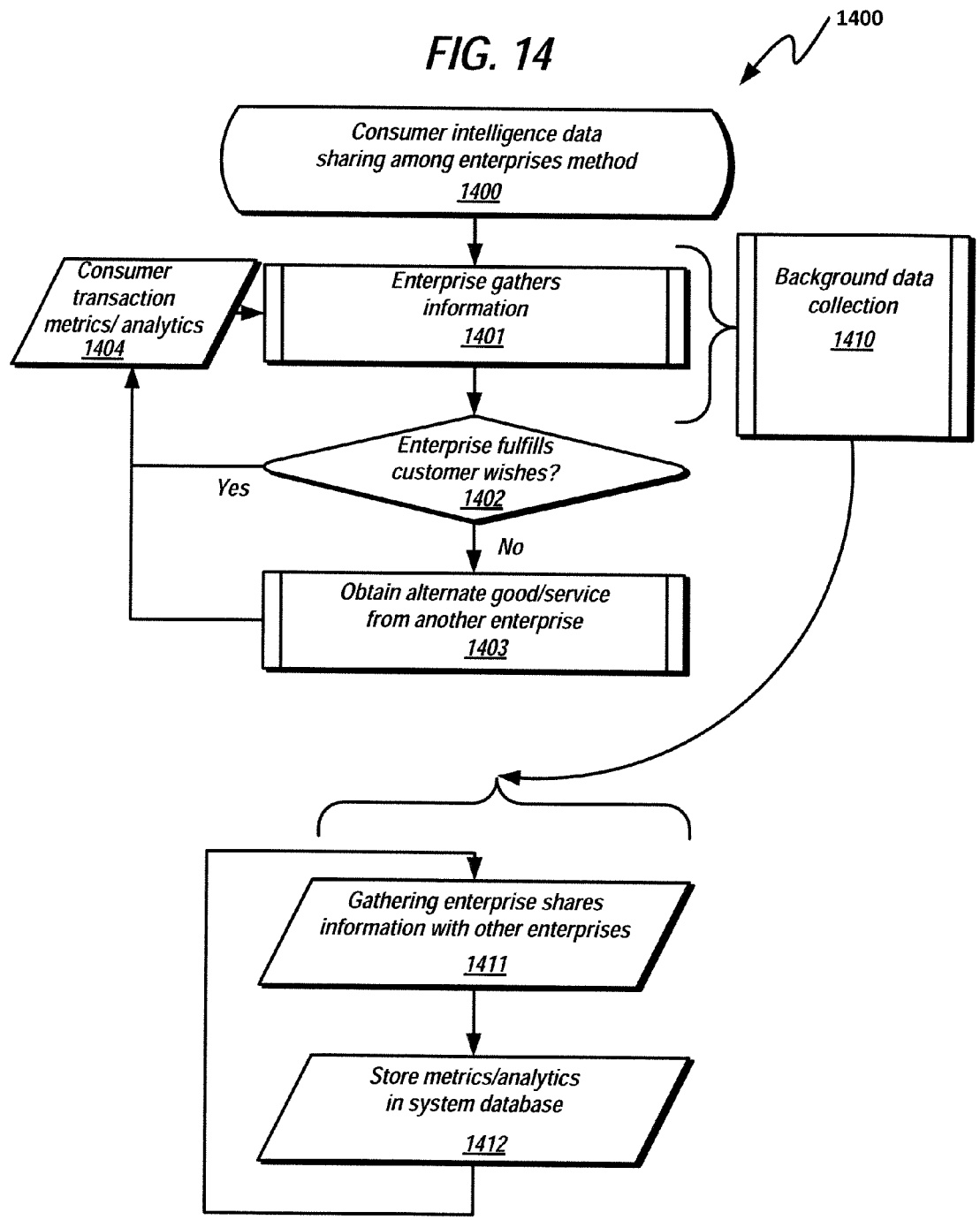

US 8,549,001 B1

METHOD AND SYSTEM FOR GATHERING AND PROVIDING CONSUMER INTELLIGENCE

BACKGROUND AND SUMMARY OF THE INVENTION

Consumer intelligence (CI) is the process of gathering and analyzing information regarding customers; their details and their activities, in order to build deeper and more effective customer relationships and improve strategic decision making. Today, CI has become an integral part of a business enterprise's information system and is used by almost all end users, businesses, and government officials to gauge whether their strategies are aligned with their company's overall global strategy.

CI data is statistically analyzed to see business insights, to forecast, and to help support better decisions. However, for any business enterprise to succeed, it must have at its disposal systems that are able to analyze and collect consumer data involved in complex business processes. Current systems contain few predictable interactions and may be easier to analyze. Emerging complex systems, by contrast, are imbued with features that may operate in patterned ways but whose interactions are continually changing in real time. Running a modern business enterprise may be characterized as a complex system that includes online and offline activity, competition and a need to understand customers, end users, and their individual needs. Accordingly, a need exists for a method and system that allows a modern business enterprise to deal with these complexities.

In one aspect, embodiments disclosed herein relate to a method for gathering and providing consumer intelligence, the method comprising the steps of receiving and storing data in a first database relating to a transaction between a consumer and a business enterprise, receiving and storing cognitive data in the first database, wherein at least some of the cognitive data relates to the consumer's emotions during a transaction between the consumer and the business enterprise, receiving and storing data in the first database relating to a transaction between two or more business enterprises, and providing data from the first database to a business enterprise in response to a request for data sent by the business enterprise.

In other aspects, embodiments disclosed herein relate to a system for gathering and providing consumer intelligence, the system comprising a computer database, wherein the computer database receives and stores data relating to a transaction between a consumer and a business enterprise, wherein the computer database receives and stores cognitive data, wherein at least some of the cognitive data relates to the consumer's emotions during a transaction between the consumer and the business enterprise, wherein the computer database receives and stores data relating to a transaction between two or more business enterprises, and wherein the computer database provides data to a business enterprise in response to a request for data sent by the business enterprise.

DESCRIPTION OF THE DRAWINGS

The detailed description will refer to the following drawings, wherein like numerals refer to like elements, and wherein:

FIG. 2 illustrates a tangible embodiment of the VRPE where a consumer uses specially equipped goggles to enter the VRPE in accordance with one or more embodiments of the present disclosure.

FIG. 8 illustrates an interrelationship of traits that lead to a state of purchasing excitement in a consumer.

FIG. 9 provides a flow chart of a perturbation analysis method in accordance with one or more embodiments of the present disclosure.

FIG. 14 depicts a flow diagram of actions taken with regard to the sharing of consumer intelligence among subscribing enterprises in accordance with one or more embodiments of the present disclosure.

DETAILED DESCRIPTION

Figure 1:
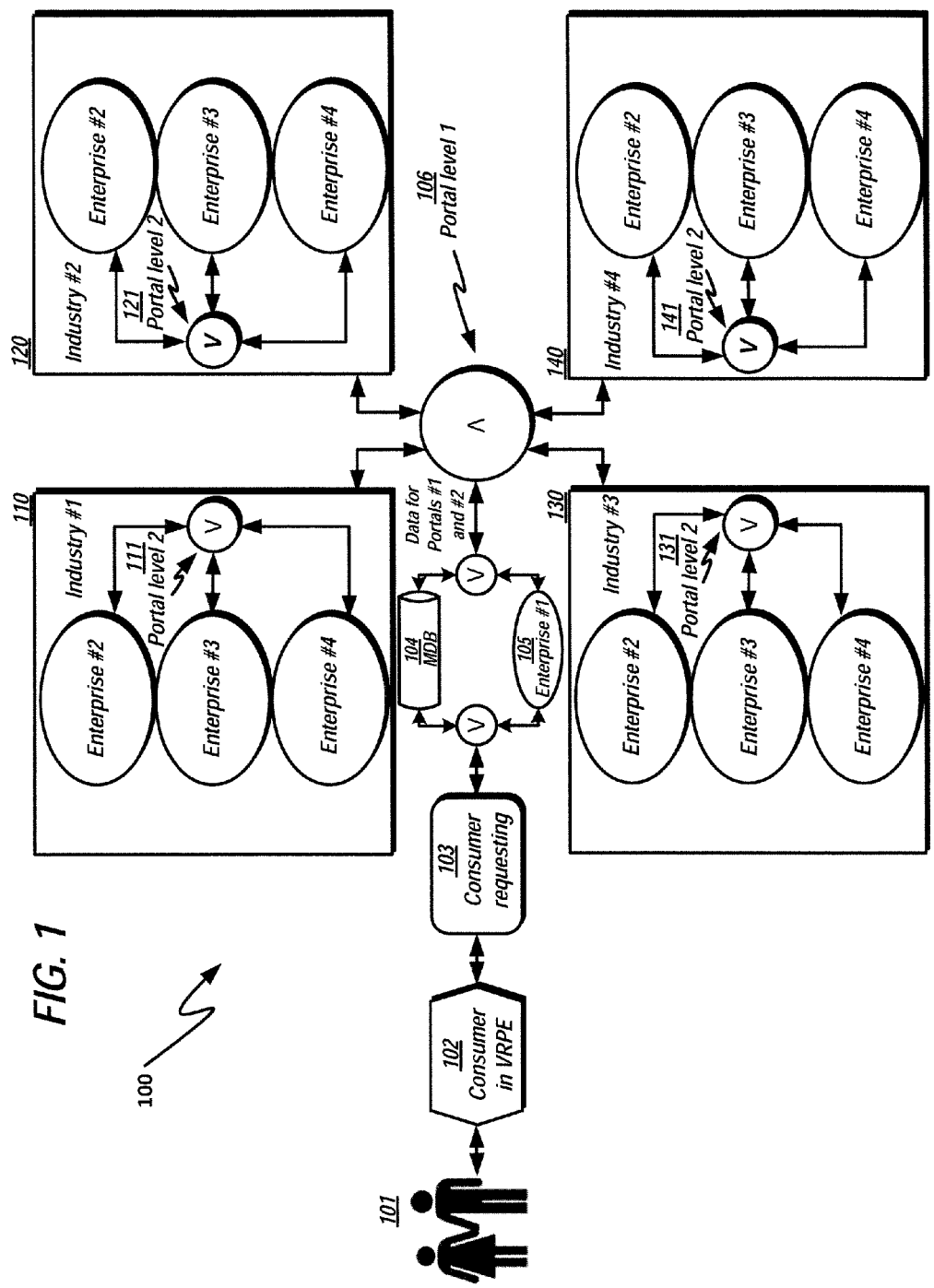
FIG. 1 illustrates a VRPE system wherein multiple enterprises within multiple industries respond to a consumer's request for goods or services in accordance with one or more embodiments of the present disclosure.

The aspects, features, and advantages of embodiments of the present disclosure mentioned above are described in more detail by reference to the drawings, wherein like reference numerals represent like elements.

Referring to FIG. 1, a virtual reality purchasing environment (VRPE) system 100 in accordance with one or more embodiments of the present disclosure is shown. The VRPE system 100 and related methods may be implemented as a cooperative economy where multiple business enterprises (i.e., retailers, wholesalers, etc.) may cooperate to provide goods and/or services to consumers upon request. As illustrated in FIG. 1, this cooperative economy permits a consumer using the VRPE to shop for goods and/or services that are virtually presented by one or more enterprises via remote enterprise interface subsystems to the VRPE. Using the VRPE, a full range of goods and services available from multiple enterprise inventories may be presented to the consumer for inspection and/or purchase.

A VRPE may be located in an enterprise retail establishment (e.g., a "brick-and-mortar" retail store). While the VRPE utilized within the context of embodiments disclosed herein may take many forms, one example is generally illustrated in FIG. 2, in which a VRPE subsystem 200 incorporates 3D goggles and many other similar devices. Alternatively, a panoramic display of video monitors that interact with 3D headwear worn by a consumer could permit a large field-of-view virtual reality environment to be presented to a given customer. Configurations such as this may be appropriate for a wide variety of retail establishments associated with enterprises that wish to cooperatively market to a given customer by promoting both local (i.e., within the store) merchandise as well as goods/services available from other enterprises that may be available via the Internet or some other communications network. The consumer 202 may view the monitors and see a selection of goods and services. In addition, one or more companions or friends 204 of the consumer 202 may join by also entering the VRPE, either in the same enterprise establishment or another. Thus, friends 204 may join the consumer 202 regardless of geographic location of either the consumer 202 or the friends 204.

Referring back to FIG. 1, a consumer 101 enters the VRPE 102 and makes a request 103 for a particular good or service. A main database (MDB) 104 may receive the consumer request 103 and sends the request to one or more business enterprises (i.e., Enterprise #2, #3, #4, etc.) in communication with the MDB 104. Alternatively, a first enterprise 105 (Enterprise #1) may receive the consumer request 103, thereby circumventing the MDB 104. As shown, the one or more enterprises may further be categorized within one or more industries 110, 120, 130, 140 (i.e., Industries #1, #2, #3, #4) relevant to the consumer's request. Initially, the MDB 104 identifies and selects a desired industry matching the consumer's request 103 at a first directory level (i.e., Directory Level 1) through a first portal 106 (i.e., Portal Level 1). Next, the MDB 104 identifies and communicates with registered enterprises (i.e., Enterprise #1, #2, #3, etc.) within the selected industry at a second directory level (i.e., Directory Level 2) through second portals 111, 121, 131, 141 (i.e., Portal Level 2).

If the particular goods or services that the consumer requests are not available in the enterprise retail establishment at which the VRPE is located, other enterprises may be queried to determine if the desired goods or services are available within their particular inventories. If so, the cooperating enterprises may be used as a source for the desired goods or services. Thus, while the original enterprise retail establishment supporting the VRPE may not acquire the consumer's purchase, it may still have an opportunity to acquire other purchases associated with the consumer's initial purchase through the VRPE.

Figure 3A:
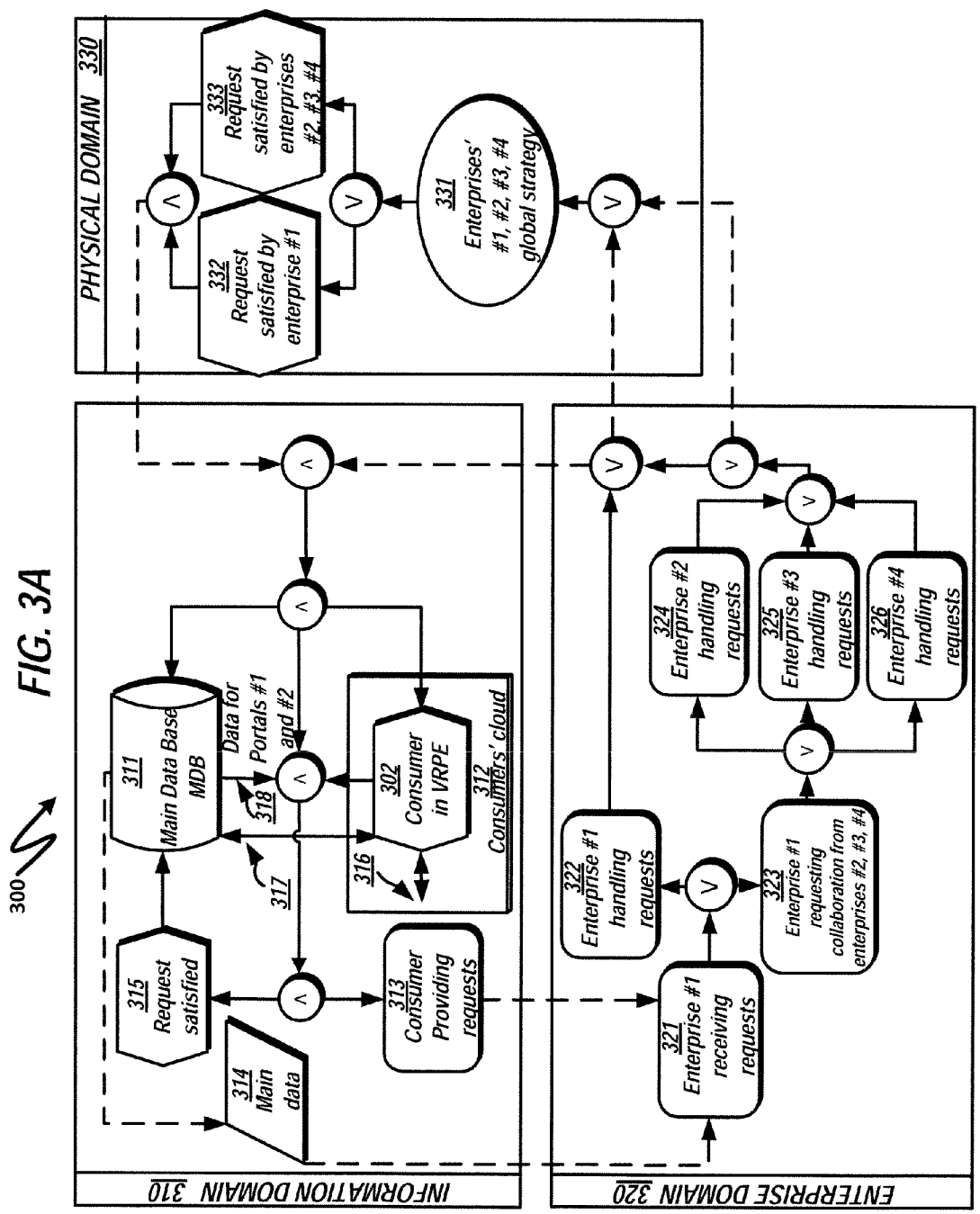
FIGS. 3A, 3B, and 3C illustrate the flow of data between an Information Domain, an Enterprise Domain, and Physical Domain of the system in accordance with one or more embodiments of the present disclosure.
Figure 3B:
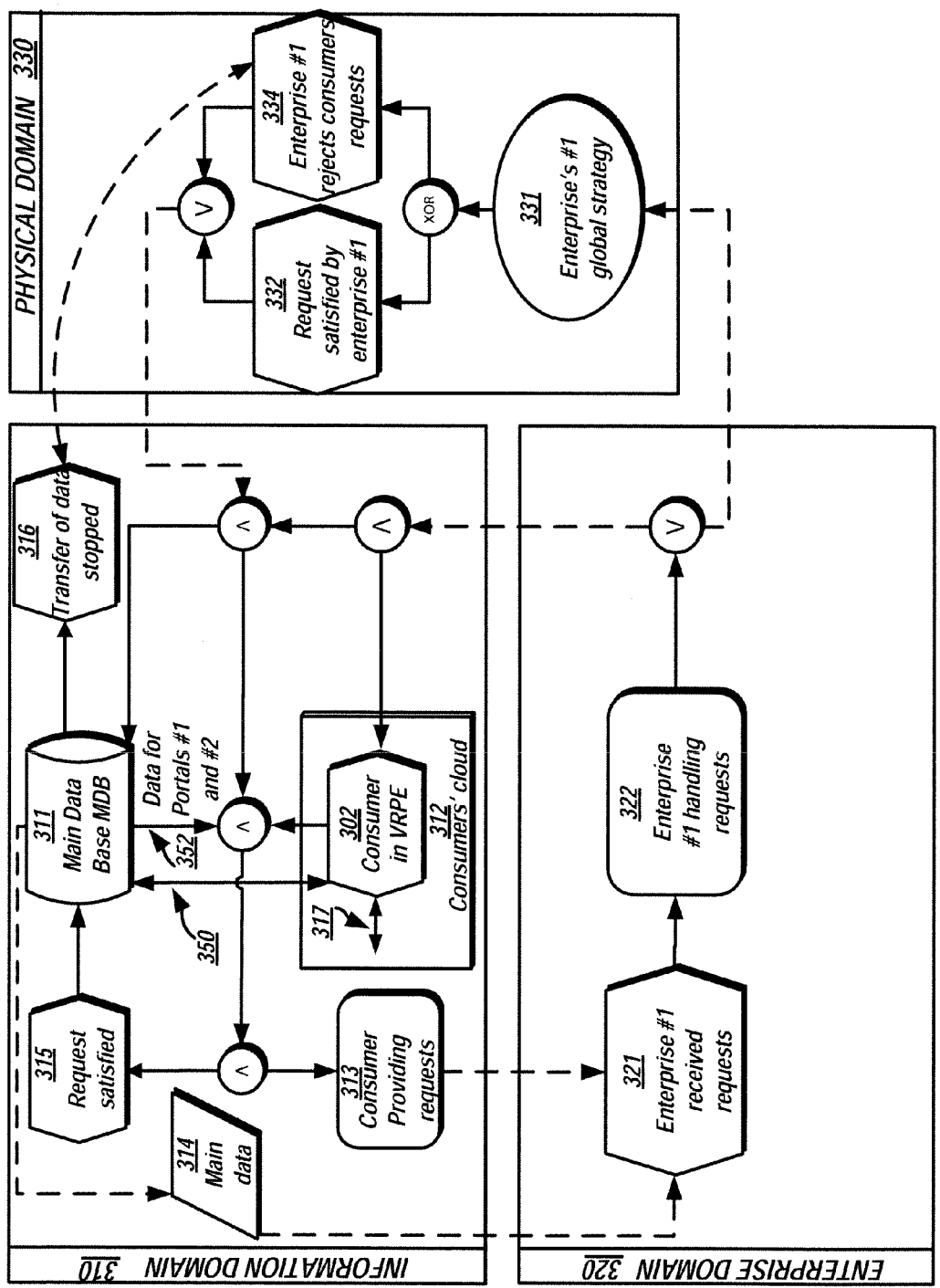
Figure 3C:
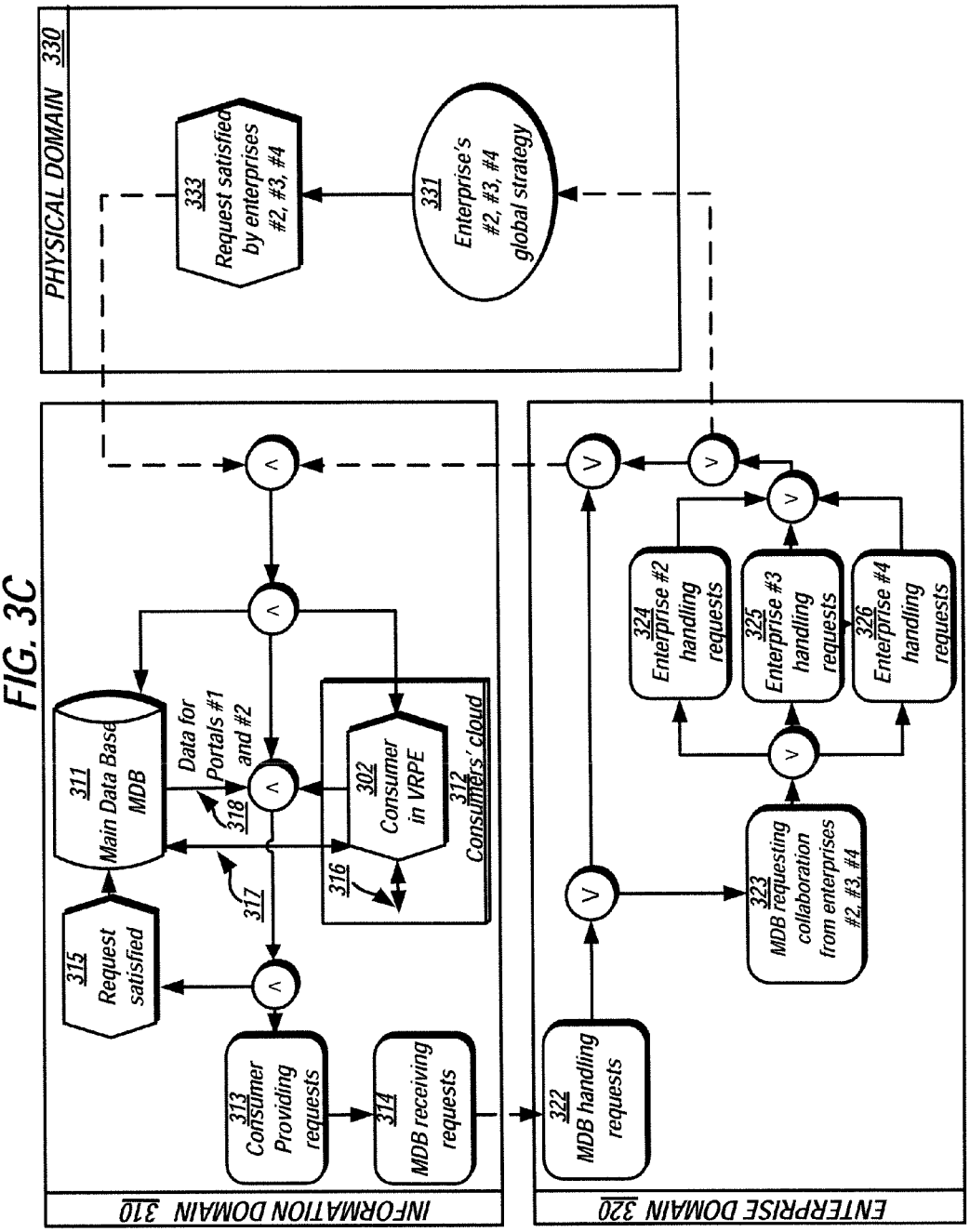

FIGS. 3A, 3B, and 3C illustrate diagrams depicting a Transparent Economy Through Consumer Intelligence (TETCI) business model used to create channels for collaboration amongst multiple industries and organizations in accordance with one or more embodiments of the present disclosure. The TETCI business model may use a combination of Service-Oriented Architecture (SOA), Business Process Choreography, Enterprise Service Bus (ESB), and Web Services technologies such as Mobile Technologies, Web 2.0 and Extensible Markup Language (XML) to extract the full potential for collecting business intelligence through business collaborations. Generally, SOA is a collection of services capable of interacting in three ways, commonly referred to as "publish, find, and bind." A service must be able to make its interface available to other services (i.e., publish), other services must be capable of discovering the interface (i.e., find), and finally, services must be able to connect to one another to exchange messages (i.e., bind). Web Services technology enables applications in separate technical environments to talk with each other, which leads to opportunities to collaborate electronically across the globe.

As illustrated in FIGS. 3A, 3B, and 3C, a system 300 implementing the TETCI business model includes an Information Domain 310, an Enterprise Domain 320, and a Physical Domain 330. Within the Information Domain, a main database (MDB) 311 stores data including initial consumer requests. The MDB 311 also stores information provided to it by enterprises that provide the VRPE experience for the consumer and data for any transaction between the consumer and the enterprise(s). The Enterprise Domain 320 represents the space occupied by a first enterprise and other enterprises that may collaborate with the first enterprise to satisfy the consumer's request. Finally, the Physical Domain 330 represents the order fulfillment processes controlled by the enterprise(s), including inventory storage, back office accounting systems, and other facilities used by the enterprise(s) for fulfillment activities, as will be known to one of ordinary skill in the art.

Referring now to FIG. 3A, the Information Domain 310 of the system 300 includes a VRPE 302, which a consumer uses to interact with the system 300. In certain embodiments, the consumer in the VRPE 302 may interact and exchange data 316 with the system 300 through a cloud network 312. The Information Domain 310 further includes MDB 311, which serves as a master repository for data within the system 300, and which exchanges data with the consumer in the VRPE 302. In addition, data is exchanged between the VRPE 302 and a first enterprise 321 located in the Enterprise Domain 320. As previously described in reference to FIG. 1, the consumer's request is initially directed through a first portal within the MDB 311, which processes the consumer's request and identifies registered industries associated with the consumer's request. The system 300 then sends the consumer's request through a second portal within the MDB 311, which identifies enterprises capable of handling the consumer's request, and submits information to the VPRE 302 or related enterprises.

Consumer requests may be sent to the first enterprise 321 as data passes from the Information Domain 310 to the Enterprise Domain 320. In one instance, the first enterprise 321 may handle the consumer request 322. Alternatively, the first enterprise 321 may request collaboration 323 from other enterprises 324, 325, 326 in handling the consumer request. Information on which enterprise handles the request (i.e., 321, 324, 325, 326) is relayed back to the main database 311. In addition, the enterprise that ultimately handles the consumer request may store all data from its interaction with the consumer in a second database 317 controlled by that enterprise. Data stored in the second database 317 may be shared with the main database 311, and contents from the main database 311 may be shared with the second database 317 upon request by the enterprise. In certain instances, the enterprise may be required to pay to share data from the MDB 311. Any of the enterprises may communicate a request for additional information from the MDB 311. This data request goes from the Enterprise Domain 320 to the Information Domain 310. The MDB 311 may then provide additional data 314 to the requesting enterprise. This cycle of requests for additional information may continue indefinitely until the consumer request is satisfied or until the consumer leaves the VRPE 302.

Finally, information on the enterprises handling the consumer request may be relayed to the Physical Domain 330 for satisfaction 332, 333 of the consumer request. For example, the enterprise that is able to satisfy the consumer's request for a particular good or service will deliver the good or service in the Physical Domain 330 and collect payment. Information relating to satisfaction of the consumer's request is relayed back to the MDB 311 so that the collection of data relating to the consumer's request is updated within the MDB 311. In certain instances, no transaction may be completed because the consumer's request may go unfulfilled by any enterprise. In this case, information relating to the failure to fulfill the consumer's request 313 must be passed back to the MDB 311.

The system 300 described above has the capability to send the consumer's request to multiple business enterprises either in the same or different industries, until the overall process of fulfilling the consumer's request is completed. The main database 311 is also capable of performing recursive transactions by submitting the consumer requests back to the first portal to find a related industry, followed by submitting the request through the second portal to find an appropriate enterprise. Alternatively, the process of submitting requests for various "sub-requirements" of a consumer request may continue through multiple industries until "cross-industry" applications have been fulfilled. The arrangement with two portal levels (i.e., Directory Levels 1 and 2) may help classify the enterprises as well as their relative industries, thereby simplifying the publication and location of the submitted consumer requests. These illustrative models of collaboration may be expanded to include multiple industries and an unknown number of enterprises.

Referring now to FIG. 3B, a system 300 is shown in which an enterprise 321 that does not adapt to Web Services technology described above remains outside the system 300 described in one or more embodiments of the present disclosure, and is unable to use intelligence (i.e., data) stored in the MDB 311. As discussed above, Web Services technology enables applications in separate technical environments to talk with each other, leading to opportunities to collaborate electronically across the globe. In this example, the consumer in the VRPE 302 within the consumer cloud 312 sends a request to the MDB 311. The MDB 311 provides this request 313 to the first enterprise 321. However, due to its failure to adopt Web Services technology, the first enterprise may be unable or unwilling to collaborate with other enterprises, which may jeopardize its ability to maintain a successful VRPE. Unable to collaborate with other enterprises, perhaps in other industries, the first enterprise is in a position of having to purchase data from the MDB 311 to succeed. As the first enterprise attempts to handle the consumer request 322, it sends data to the VRPE 302. The VRPE 302 is modified to continue to manipulate the consumer's emotions and move him or her to a state of purchasing excitement, which will be described in greater detail below.

The first enterprise might either satisfy that request 332 or reject the consumer request 334. If the consumer's request is rejected 334, then any transfer of data from the enterprise and the MDB 311 is stopped 316. As with the earlier example, the first enterprise is able to send requests to and receive additional data 314 from the MDB 311. This cycle of requests may continue until the consumer's request is satisfied, or the consumer leaves the VRPE 302. Further, the consumer may provide additional requests 313 that are passed to the first enterprise. The first enterprise receives those requests 321 and may attempt to handle the requests as well 322.

However, an unregistered enterprise or a client wanting to use the system 300 may still be able to use the MDB 311 services. Referring to FIG. 3C, a diagram of the system 300 is shown in which an unregistered enterprise may use the MDB 311. The MDB 311 in the Information Domain 310 sends out a consumer request 313. Due to a lack of registered enterprises to receive the request, the MDB also receives the consumer request 314 in the Information Domain 310 and handles the request 322 in place of an enterprise once the request is sent to the Enterprise Domain 320. The MDB 323 then requests collaboration from enterprises 324, 325, 326. At least one of those enterprises 324, 325, 326 may handle the request. Data relating to transactions between two or more of the enterprises in collaboration is sent to the MDB 311, where the data is received by the MDB 311 and stored. However, in this case, the MDB 311 creates the VRPE 302 in the consumer cloud 312. Once in the Physical Domain 330, the request is satisfied by an enterprise 333. In certain embodiments, an enterprise may base a decision to accept or reject a consumer request based on their global strategy 331.

The VRPE creates a computer-generated 3D real-time environment where consumers interact with a simulated environment. This environment may be as visually rich as any movie, but differs from movies because the actions that the consumer takes affect the environment. Two features of a virtual environment are temporal and spatial realism. Temporal realism means that events take place in real time and that there are no distracting lags or discrete time lapses. Spatial realism means that images are understood by the simulation software as 3D and that participants may move around and view objects from different perspectives. Therefore, the creation of a virtual reality purchasing environment (VRPE) in accordance with one or more embodiments disclosed herein allows a consumer to become immersed in their own purchasing experience.

Figure 4:
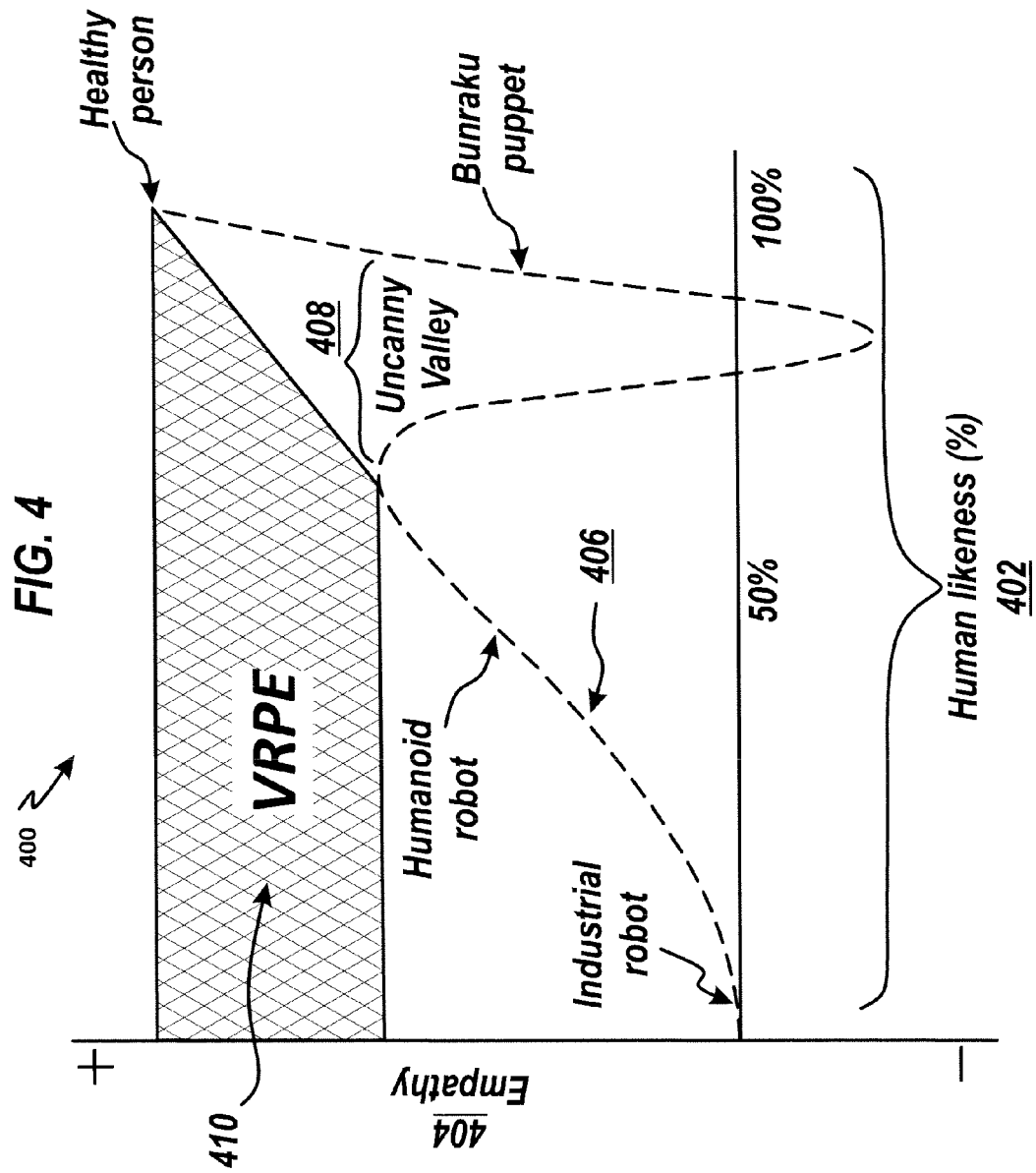
FIG. 4 illustrates the concept of the "uncanny valley."

As with any virtual reality experience, however, the VRPE described herein may be subject to a hypothesis in the field of robotics and 3D computer animation known as the "uncanny valley." This hypothesis holds that when human replicas look and act almost, but no perfectly, like actual human beings, it causes a response of revulsion among human observers. The "valley" refers to a dip 408 in a graph 406 (illustrates in FIG. 4) of the comfort level of humans 404 (represented by the Y axis) as function of a robot's human likeness 402 (represented by the X axis). The VRPE 410 described in embodiments disclosed herein avoids the pitfalls of the uncanny valley while simultaneously moving the consumer toward a state of purchasing excitement. Indeed, the VRPE moves the consumer toward purchasing excitement by influencing personality traits which are closely tied to shopping behavior. Methods, and systems on which said methods are implemented, for avoiding the uncanny valley in the VRPE while moving a consumer toward purchasing excitement are described in the one or more embodiments that follow.

Figure 5:
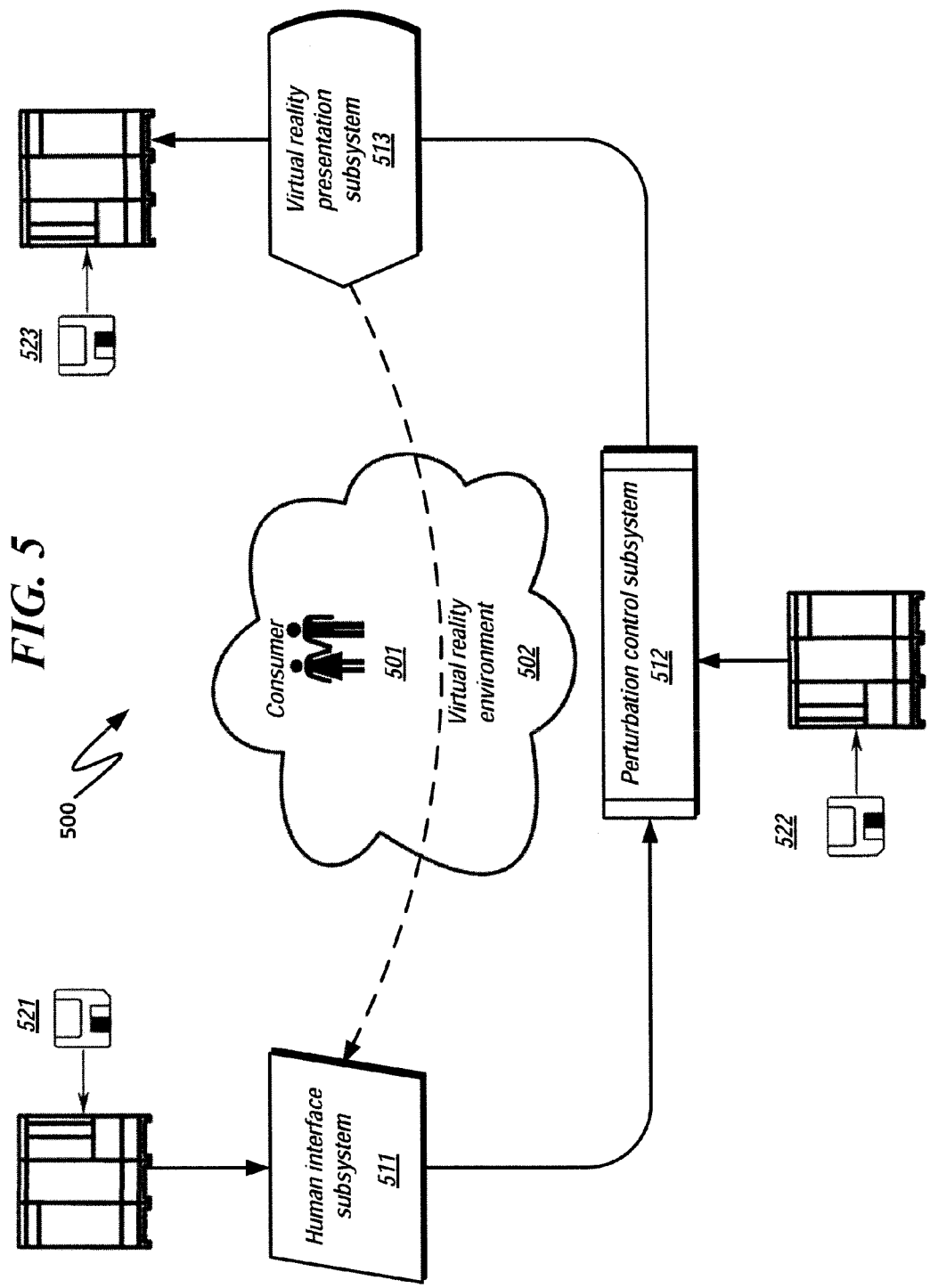
FIG. 5 illustrates interaction between a consumer and a human interface subsystem, a perturbation control subsystem, and a virtual reality presentation subsystem in accordance with one or more embodiments of the present disclosure.

Referring now to FIG. 5, a system diagram 500 showing interaction between a consumer 501 and a human interface subsystem in accordance with one or more embodiments of the present disclosure is shown. While the consumer 501 is immersed within a VRPE 502, the VRPE 502 elicits a variety of responses from the consumer 501 which are then collected using a human interface subsystem 511. The human interface subsystem 511 may collect active and/or passive responses from the consumer 501 using a variety of data collection methodologies including, but not limited to, questionnaires, graphical user interface input, biometric data collection, facial expression analysis, hand gesture recognition, arm position recognition, and eye position analysis, and other data collection methodologies known to one of ordinary skill in the art. This feedback information is fed into a perturbation control subsystem 512 that modifies the control parameters associated with the VRPE 502 based on the customer responses to the human interface subsystem 511. The resulting perturbation data is applied to a virtual reality presentation subsystem 513, which is responsible for the actual creation and presentation of the VRPE 502 shown to the consumer 401.

As shown, system 500 incorporates a feedback control loop from the consumer 501 to the human interface subsystem 511 to the perturbation control subsystem 512 to the virtual reality presentation subsystem 513 back to the VRPE 502 presented to the consumer 501. This feedback control loop constantly adjusts the VRPE 502 presented to the consumer 501 based on data obtained from the consumer feedback as well as data obtained, as needed, from other enterprises or from the main database. This control loop is configured to maintain the consumer 501 in a psychologically receptive purchasing mode, or a "purchasing excitement" state. The perturbation control subsystem 512 integrates the human interface subsystem 511 information and general customer/specific consumer preferences to ensure that the consumer 501 is kept in a positive purchasing state. Specifically, the VRPE 502 environment may be altered to stimulate or optimize the consumer's emotions, and specifically those associated with the consumer's traits. The VRPE 502 floods the consumer's senses with audio/visual stimuli to achieve access to consumer memories favorable to a positive purchasing decision.

The feedback control loop illustrated in FIG. 5 may incorporate initialization data obtained from the consumer 501, entered via the human interface subsystem 511 and provided to perturbation control subsystem 512 to provide a starting point for the virtual reality presentation subsystem 513, to generate and present an initial VRPE 502 for the consumer 501 to operate within. During the consumer's use of the VRPE 502, further consumer feedback that may be subsequently gathered by the human interface subsystem 511 is used to update the VRPE 502 based on the consumer response. Within this system context, each of the major system components 511, 512, 513 may have associated with it computer control systems running a variety of computer application programs and/or software that is retrieved from a computer usable medium 521, 522, 523 having computer-readable program code means.

Figure 6:
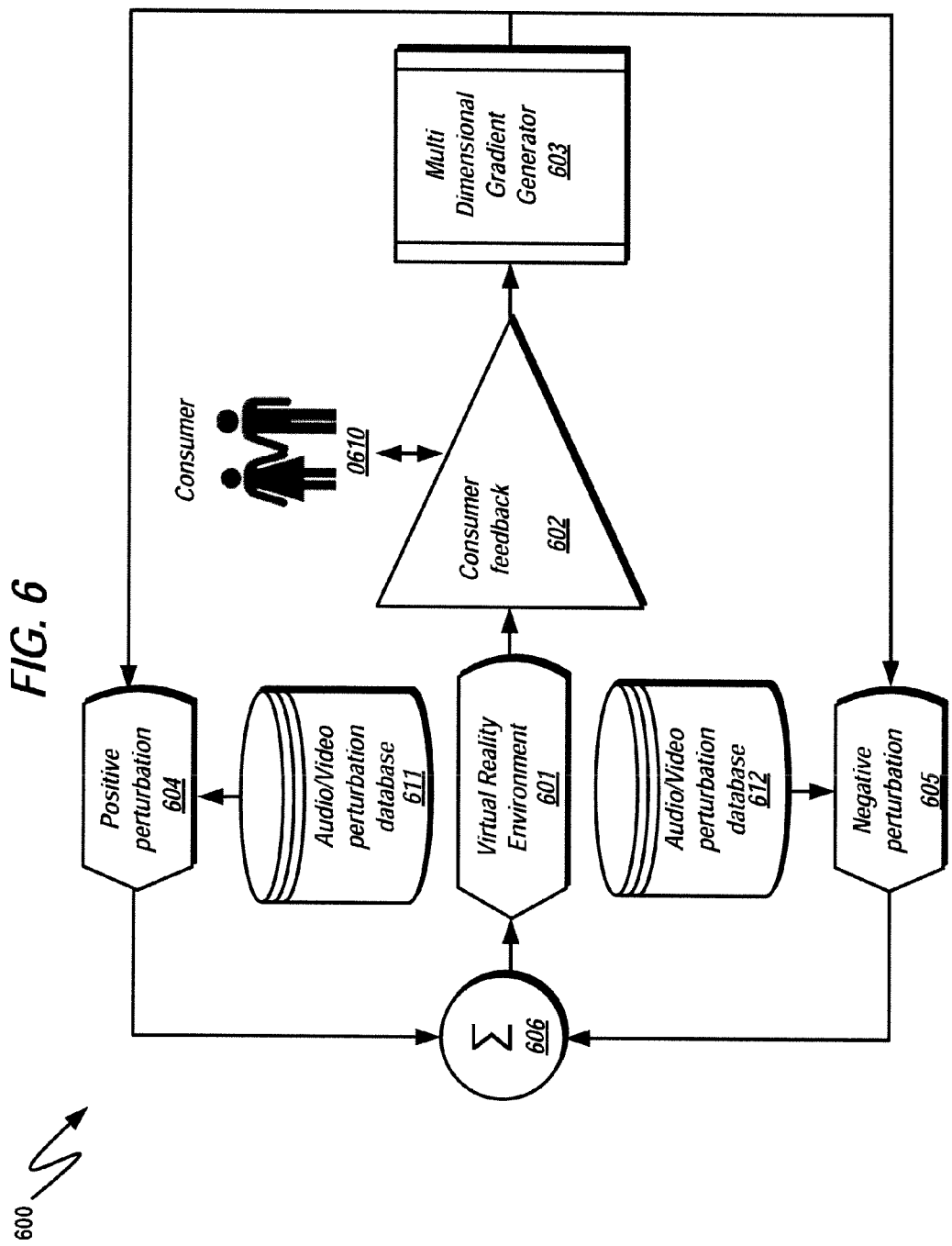
FIG. 6 illustrates use of a feedback control system in accordance with one or more embodiments of the present disclosure.

FIG. 6 further illustrates a feedback control system 600 used in conjunction with operation of the VRPE in accordance with one or more embodiments of the present disclosure. A feedback control loop of system 600 is designed specifically to set an "operating point" of the virtual reality purchasing environment. It achieves this goal by providing positive and negative feedback as necessary to ensure that the consumer avoids the pitfalls of the "uncanny valley" problem while being simultaneously moved towards purchasing excitement.

The VRPE 601 presented to the consumer 610 incorporates one or more passive/active consumer feedback data inputs 602 that gauge the consumer's 610 response to the currently presented VRPE 601. From this consumer feedback, a gradient vector generator 603 may be utilized to determine in what direction the VRPE 601 should be modified to encourage the consumer 610 towards a purchasing excitement state. The gradient vector generator 603 may take into account consumer 610 specific preferences, such as general consumer preferences based on similar consumer demographics, input from social media networks, data from third-party marketing sources, and other consumer preferences identified by one of ordinary skill in the art. This may be the data obtained from the main database, previously described. From this information either positive perturbation 604 or negative perturbation 605 information may be fed back and integrated 606 into a new and updated VRPE 601 for the consumer 610 to experience and eventually provide new feedback 602. The positive or negative feedback may be represented by a change in control criteria parameters. These modifications create new control parameters that determine whether a state established by a particular process satisfies the modified control criteria. Thus, the consumer feedback 602 has a direct impact on whether a C-OODA loop resolves a request through a Simple Match cycle, a Diagnosis cycle, or an Evaluate Course of Action cycle, each of which are explained in greater detail below (in reference to FIGS. 7A through 7E).

Within this context there may exist a variety of perturbation databases 611, 612 that may be used to select elements within the VRPE 601 that may be slightly modified to achieve an overall positive consumer 610 response. The incorporation of this perturbation data may move the consumer 610 to remain in the VRPE 601 without the need for perfect lifelike rendering within the VRPE 601. This feedback control loop essentially "jumps" the "uncanny valley" by creating identification between the consumer and the created VRPE 601, so as to link the consumer to the displayed environment.

Within this feedback loop, perturbations may be utilized to determine both positive and negative responses from the consumer 610. Thus, the perturbation databases 611, 612 may incorporate testing information to classify the consumer 610 within various categories that have associated with them a variety of associated attributes. For example, the presentation of a dog within the virtual environment scenario might trigger a positive response from a "dog person" and an associated negative response from a "cat person." Within this example, the presentation of different types of dogs might further refine the individual as a "large dog" or "small dog" person with further refinements associated with specific breeds. Within these differentiations, there might also be associated ancillary interests such as "sporting goods" associated with "hunting dogs" and the like. Furthermore, integration of the perturbation databases 611, 612 with general customer demographic data (for example, tying "hunting dogs" and "sporting goods" to specific geographic regions of any country in the world) may permit a more informed virtual environment perturbation analysis to be performed within the context of the overall virtual environment control loop.

Embodiments disclosed herein utilize a cognitive version of an OODA loop (i.e., Observe, Orient, Decide, Act) known as a C-OODA loop. FIGS. 7A through 7E illustrate use of the C-OODA loop and how certain parameters are perturbed to overcome the "uncanny valley" discussed previously. Situation awareness (SA) is the perception of the elements of the environment within a volume of time and space, the comprehension of their meaning, and the projection of their status in the near future. From this definition, as it can be seen, SA is concerned with the understanding of a situation without necessarily leading to a decision-making process. While many other factors may come into play to affect the quality of the decision-making process, SA must be considered as a main precursor to decision-making.

Figure 7A:
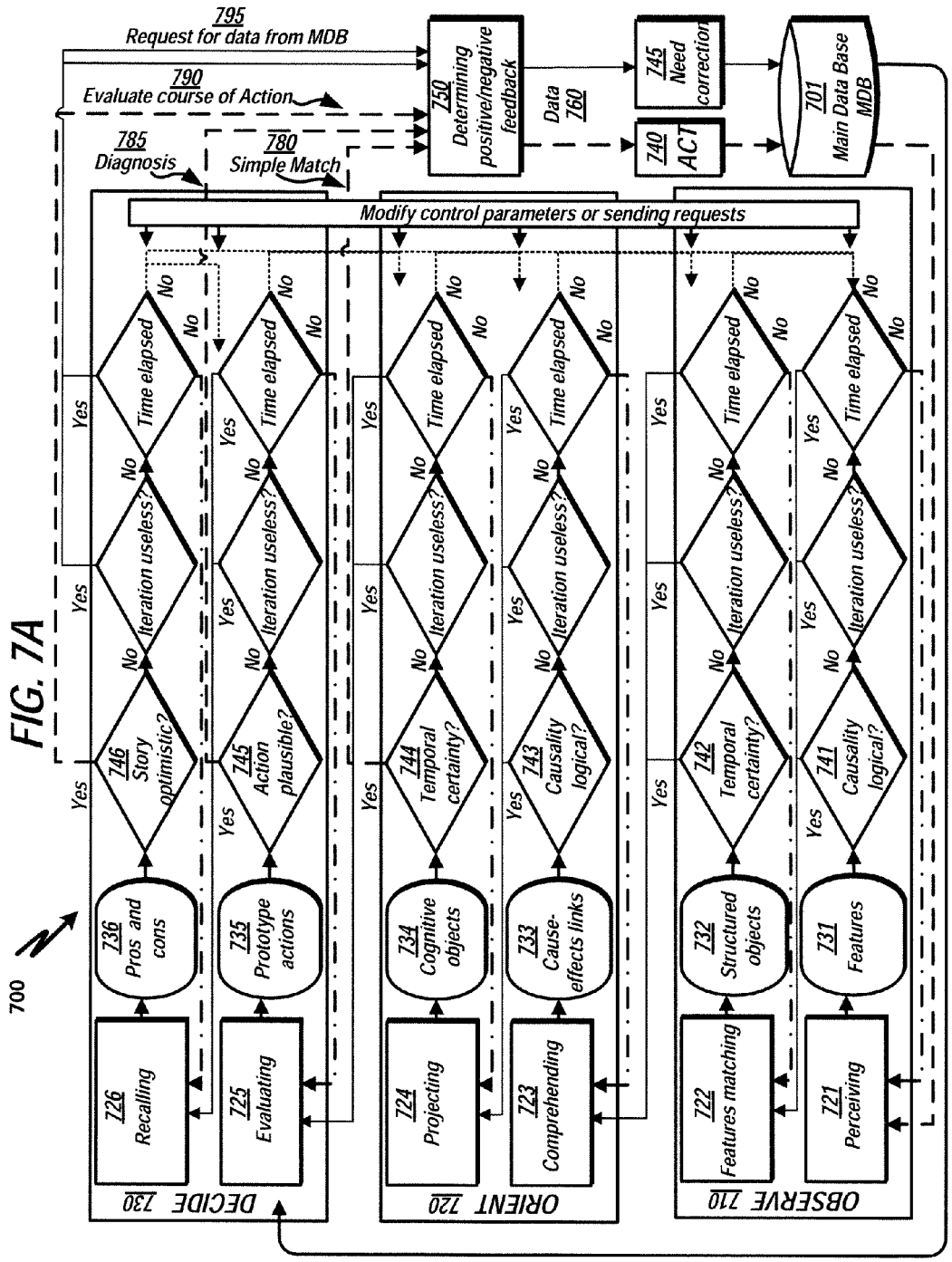
FIGS. 7A through 7E illustrates various examples of a C-OODA loop including the Simple Match, Diagnosis, and Evaluate Course of Action cycles.
Figure 7B:
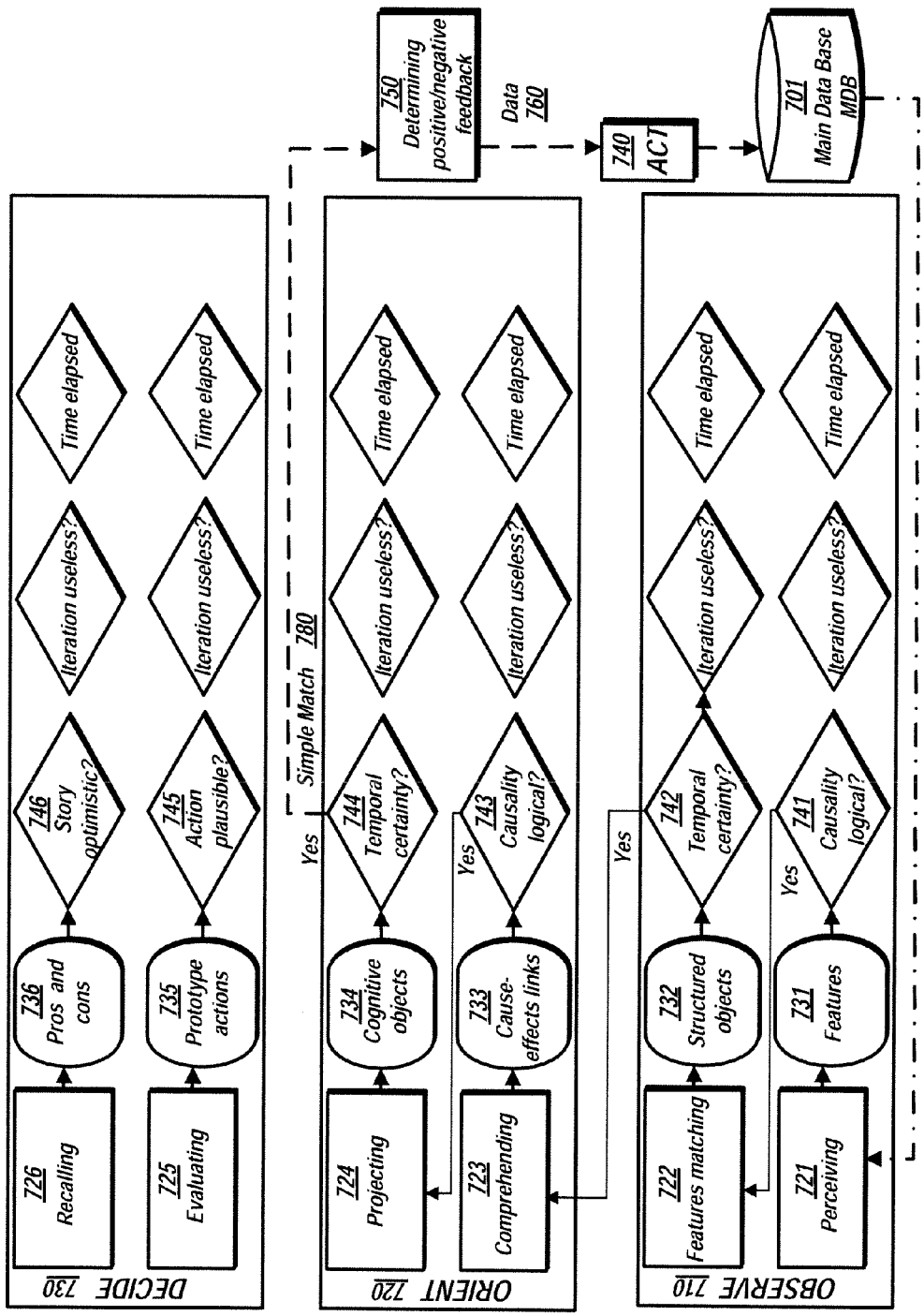

FIG. 7A illustrates a C-OODA loop that is suitable for use in the creation and perturbation of the VRPE in accordance with one or more embodiments of the present disclosure. The C-OODA loop 700 includes an "Observe" process loop 710, an "Orient" process loop 720, a "Decide" process loop 730, and an "Act" process loop 740. Flow of data through the loops is sent to a main database 701. The C-OODA loop emulates a model of how humans make quick effective decisions when faced with complex problems, also known as Recognition Primed Decisions (RPD). Decision-making in the C-OODA loop may be achieved at three different levels: Simple Match (FIG. 7B), Diagnosis of the situation (FIG. 7C), and Evaluation of the Course of Action (FIG. 7D). The result of the decision-making process for each of these levels is the implementation of the action. However, each includes various steps allowing for adaptation to the complexity and familiarity of the situation. Even if Situation Awareness (SA) described previously and RPD do not focus on the same part of the whole decision-making process, observations and parallels may be made from their comparison. Though SA and RPD may not address decision-making in details, both models include an observation phase labeled "Perception" for SA and "Recognition" in the RPD, which may be considered equivalent.

In RPD, the orienting phase of the decision-making process is represented with a general box labeled "Understanding," which includes both "Comprehension" and "Projection" processes. The Projection process raises the importance of the temporal aspect in understanding a situation. The decision part is kept outside of the SA. The RPD is more explicit for this part of the C-OODA loop. Therefore each phase of the loop may be decomposed into processes based on the SA and RPD. Therefore, the Observe process 710 may be defined from both the SA perceiving process 721 and the RPD 722. Next, the Orient process 720 may be defined from the comprehension 723 and projection activities 724 of the SA. Finally, the Decide 730 process may be defined from the recall 726, and evaluate processes 725 may be defined from the recall and evaluate activities of the RPD model.

The Observe phase 710 includes two stages. A first stage registers 721 features from the environments, while a second stage matches these features 731 with knowledge stored in long-term memory (e.g., MDB) to extract structured objects 732 from these features 731. The structured objects form a scene defining a given situation. A high level of familiarity would rise, from the long-term memory information and knowledge required to act automatically and accordingly to the goals and expectancies related to the situation. In the second stage, these features may be integrated together to form a unitary object. These objects become the basic elements of information considered in the decision cycle. Detection of features is cognitively automatic while their integration is controlled.

In the Orient phase 720 causal relationships 733 between the structured objects identified in the Observe phase 710 may be analyzed. One benefit with model of SA is that it includes a projection process that raises the importance of the temporal aspect in understanding a given situation. One may have an understanding of a static picture, but it also helps to understand how the situation may evolve within a volume of time and space in order to act correctly. Thus, in the C-OODA loop, both the comprehending 723 and projecting processes 724 define the Orient phase 720.

In the C-OODA loop, each process may be controlled by a set of three control criteria components. Control criteria is specific to the nature of that process and its resulting state. For instance, the Observe phase includes two processes, perceiving and features matching that produces respectively a set of features and a set of structured objects. Their specific criteria are the clearness of the features 741 produced from the perceiving process and the familiarity 742 of the structured objects built from the features matching process. Thus, the specific criteria control the quality of each Process-State couple included in the different phases of the C-OODA loop.

In addition to the specific criteria, two other general classes of criteria may be included in the C-OODA phases, which are generally applied to each Process-State couple. A first general criterion concerns the usefulness of executing further iterations to improve the certainty level of a given state produced from a given process. In some circumstances, even if the thresholds associated with the specific criterion for a Process-State couple is not met, the iteration process may be stopped if further iteration does not seem to increase significantly the certainty level. This criterion is generally applied through each C-OODA phase. However, for each Process-State couple, its value may be influenced by the specific criterion value. The evaluation of the usefulness of additional iteration may be a function of the gain in information that these additional iterations generate. This raises the importance of evaluating the costs and benefits associated with executing further iterations. For instance, an enterprise may accept an important cost in terms of resources and time if an additional iteration is expected to provide a considered valuable piece of information. The first two criteria may be related to the execution accuracy. The third criterion, which may be generally applied through all C-OODA phases, concerns the time available to execute each sub-process. In some situations, even if the certainty thresholds are not met and further iterations would be expected to provide valuable information, the iteration process may have to be ended when the time to proceed to another iteration is longer than the time available in the situation.

Time control component refers to the time allowed to execute a given C-OODA stage. However, there is still a general time constraint that affects the total C-OODA cycle. In some circumstances, when the time available to execute the complete decision-making process has elapsed, the final decision will be based on incomplete processing. The notion of general time constraint raises the importance of scheduling the time allowed to execute the different C-OODA phases. All these criteria, specific or general, can be explicitly defined and externally set based on the goals provided by consumer as well as by enterprise.

Finally, the complexity of setting control parameters is also increased by the distinction between the real period of time available and the subjective evaluation of the time available. Time urgency refers to a constant acceleration imposed by the C-OODA loop through audio and video stimulation. However, because of this constant acceleration, an enterprise running the C-OODA loop may not have the power or resources to measure situational awareness, and thus, the enterprise may be required to purchase additional power or resources from a database having said power or resources to continue. The reverse may also be true. Factors described below such as emotions or personality traits may affect the feeling of time urgency. In the context of a decision-making task, time-stress, defined as the ratio of the time available to perforin a task to the time required, constrains the decision algorithm, which may lead to neglecting relevant information, processing the incorrect or irrelevant information, omitting or delaying action, and then reducing the quality of decision. Time-stress is one factor responsible for cognitive overload. Overall, time-stress may influence decision-making in terms of reducing information searching and processing. Because of the discrepancies between real control parameters values and their subjective evaluations that one may make based on his or her background, expertise, etc., setting those parameters may be a challenging task. This situation asks for use of more complex data (e.g., one from MDB) for a continuous monitoring of those parameters in order to adjust the task performance to the situation. The dotted arrows on the right side of FIG. 7A suggest that these control parameters may be modified in order to improve the accuracy level of the state or the time taken to reach that level. The simple distinction between the real certainty value and its subjective evaluation may also stand for explaining individual differences in the task performance.

In order to show the functioning of the C-OODA loop, below are provided examples for three different decision making situations, Simple Match, Diagnosis, and Evaluate Course of Action. FIG. 7B represents the Simple Match 780 decision making level, which depends on the environmental features that are registered. It may be activated when a given situation is simple and straightforward, that is, when elements of the situation, the objectives, and the typical course of action to implement are easily recognized and identified. The C-OODA loop is compatible with the Simple Match decision cycle 780. The Simple Match 780 decision making level occurs in both the Observe 710 and Orient 720 phases of the model. Because their certainty level reaches the desired threshold, no further iteration is required. These features are instantly fed into the features matching process in order to automatically extract structured objects. The detection of features may be automatic for highly familiar features. For that to occur, automatic cognition has to be situated. The actions associated with this data with a particular object is displayed in the context of a specific task and environments. In the Observe phase, the familiarity 741 of a situation is assessed. A high level of familiarity may trigger, from long-term memory (e.g., consumer intelligence stored in MDB) well-known and practiced cause-effect links 733. Consequently, in the Orient phase the adequate causal links may be triggered. The VRPE is constructed by the enterprise running the C-OODA loop and the consumer is observed for negative and positive feedback 750. Actions occur to modify the VRPE and all information relating to actions taken to modify the VRPE is received by and stored in main database 701.

Figure 7C:
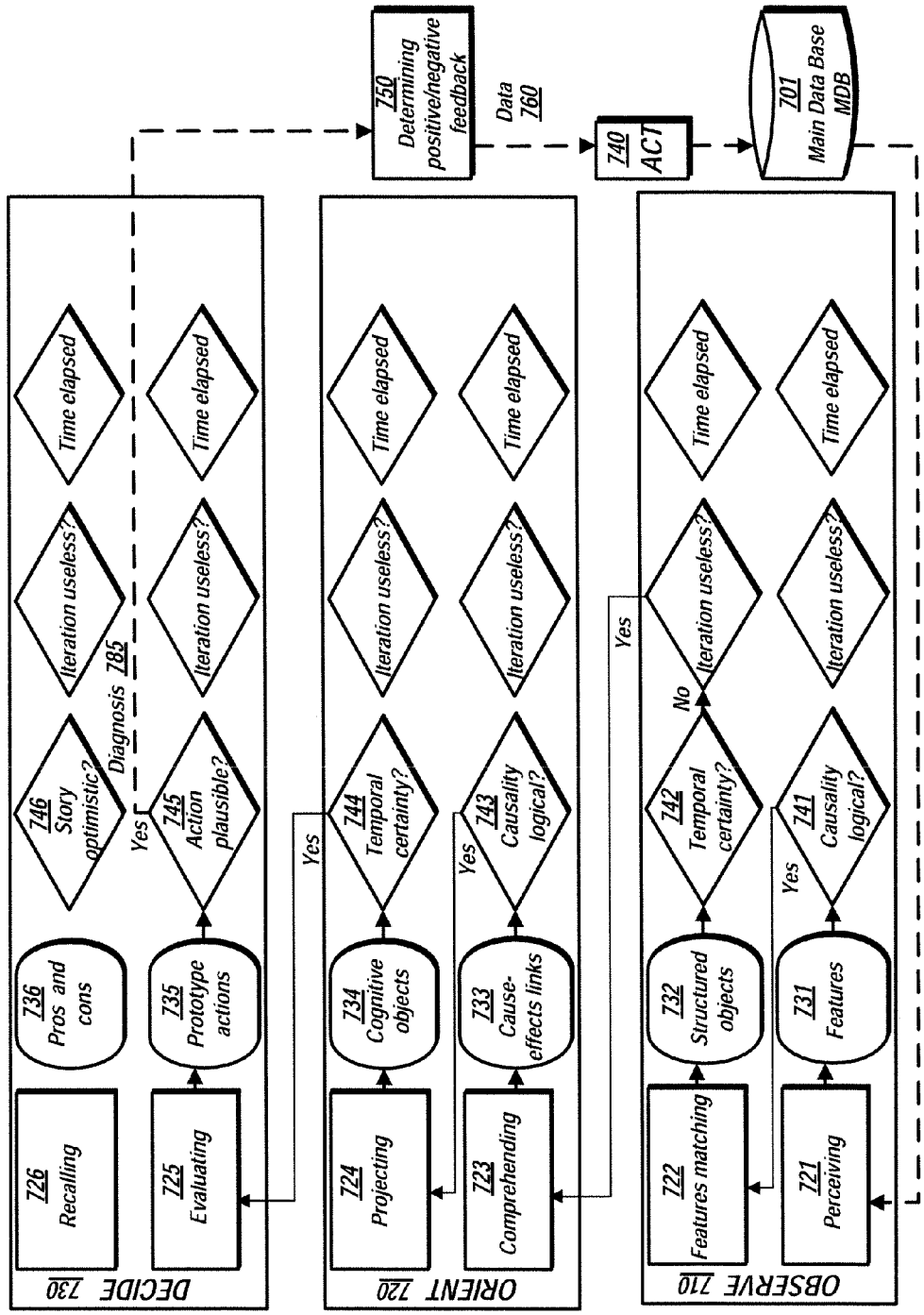
Figure 7D:
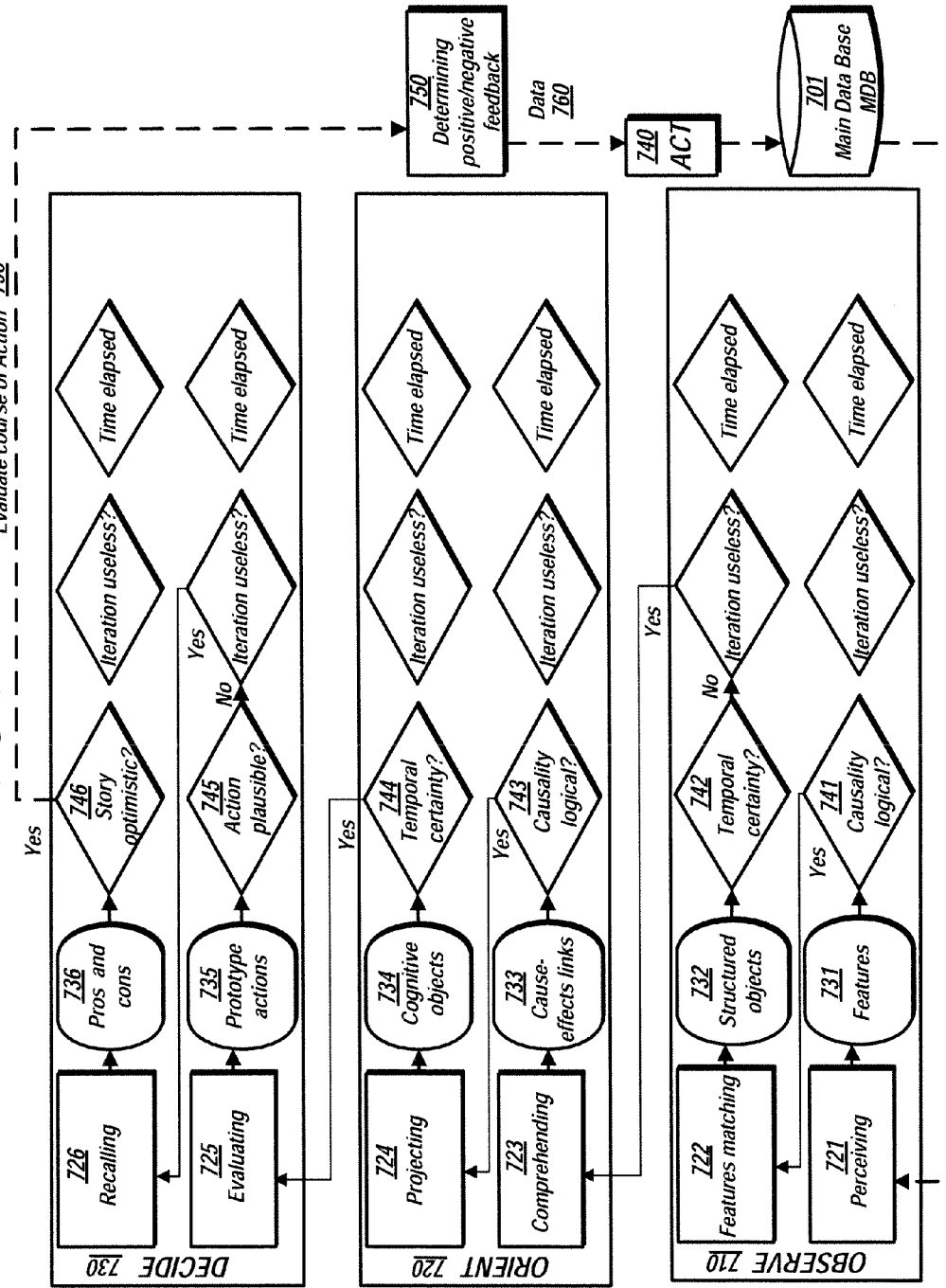
Figure 7E:
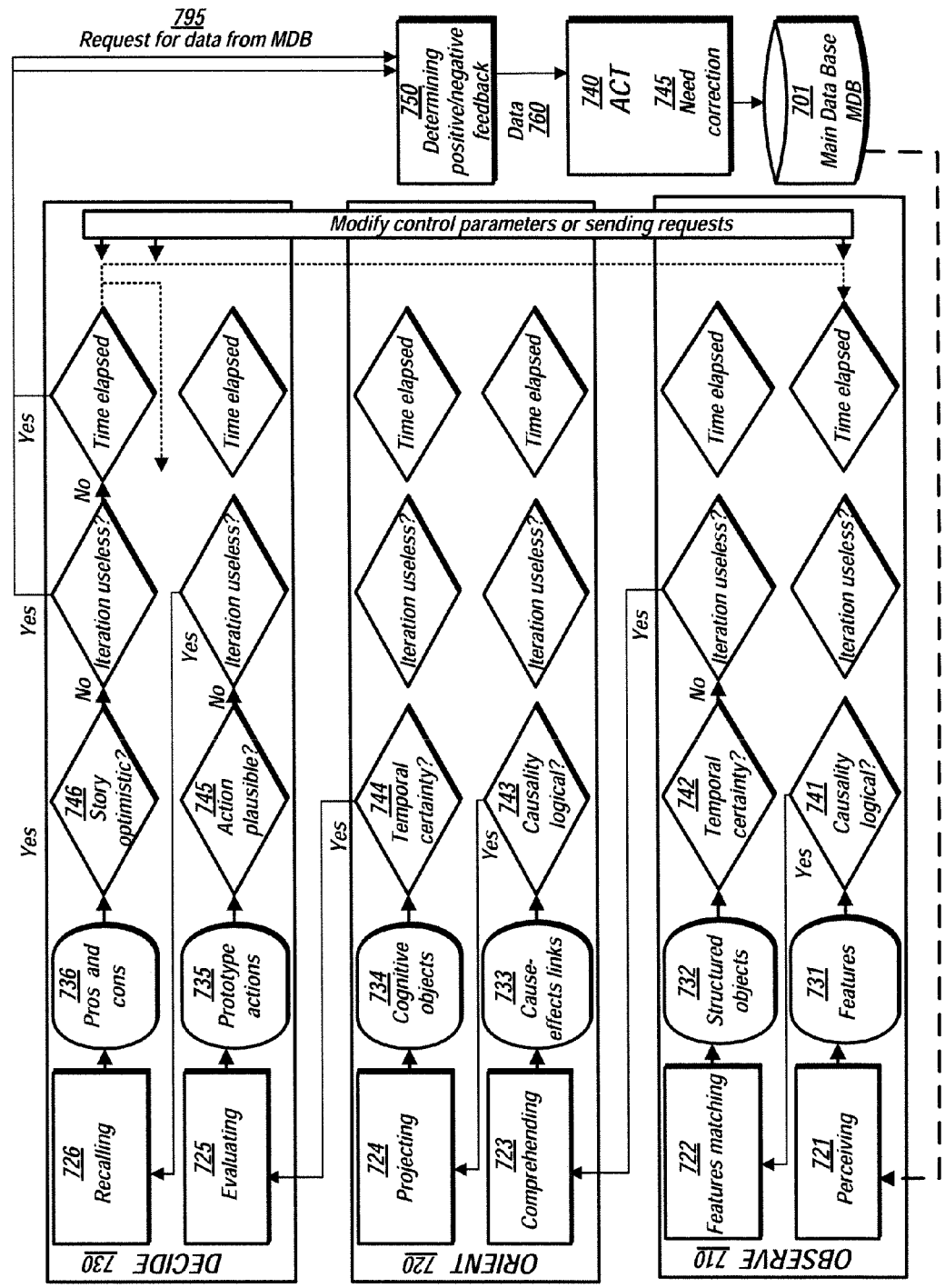

FIG. 7C is an illustration of the Diagnosis Decision Cycle 785 situation in which the decision is the result of the stages included in the Orient phase 720 and the first stage of the Decide phase 730. The Diagnosis level is required to cope with the presence of uncertainty concerning the situation. This given situation is not necessarily complex, but it does not refer to familiar mental models. At this point, the Diagnosis level may represent an attempt to establish a relationship between an event and causal factors in order to define the situation and find an acceptable explanation for it. Diagnosis processing implies a greater cognitive effort than Simple Match 780, because of the need for excess data.

As mentioned above, the Diagnosis level is performed via two stages, comprehending 723 and projecting 724, both in the Orient phase 720 and the first stage, recalling 726, of the Decide phase 740. From the comprehending stage 723, the diagnosis process involves the categorization of the situation based on a set of "if-then" rules. In the next one, under the responsibility of the projecting stage 724, the projection of the status of the situation within a volume of time and space is executed. This process evaluates what would be the consequence, in a near future, if changes occur for the status of the objects included in the mental model. The result of the projecting stage influences the recall of potential actions that can be applied in the given situation. The potential actions may be deduced from the combination of two or more known cause-effect rules 733. The iteration process may involve other C-OODA phases. For instance, requests can be sent to the Observe phase to provide more information or the Orient one to clarify the meaning of a given piece of information. Prototype action 735 are created and evaluated to determine if the prototype actions are plausible 745. If so, then the data 734 is implemented and positive and negative feedback 760 is determined.

In a case where the Diagnosis level does not allow the identification of an adequate solution to a complex and unfamiliar situation, decision-making may switch to the higher analytical level, the Evaluate Course of Action level, as shown in FIG. 7D. That level of decision-making is based on a more evaluative process that takes time and resources. Consequently, the use of such process may be significantly hampered by the presence of time constraints in the situation. The Evaluate Course of Action level 790 may require enrollment of the main database (MDB) 701 to simulate the envisioned course of action to evaluate potential difficulties, possible solutions and, consequently, to determine if this action must be implemented or if further evaluation is required to identify a new course of action. Similar to the Diagnosis level 785, Evaluate Course of Action level 790 relies on the complete execution of both the Observe 710 and Orient phases 720 of the C-OODA loop. The distinction between both levels lays in the involvement of the Decide phase 730, particularly in the results of the control components of the recalling stage 726. The Diagnosis level is performed to identify the best alternative as long as further iterations are seen to be useful and there is still time available to execute them.

Following the recall of potential actions, a computer algorithm evaluates the pros and cons 736 of selecting those actions in the current situation. If the result of the evaluation stage through the algorithm simulation is optimistic, the ideal action is selected to be implemented. In some situations, actions with lesser level of confidence can be selected. This is shown by thin arrows on FIG. 7E. These situations happen when an action must absolutely be implemented, the story 746 does not provide a high-level of optimism, further iterations seem useless or the time to execute them is not available. In this case, to keep the VRPE in existence, the enterprise will have request additional consumer intelligence from main data base (MDB). At this point, information from the main database 701 may be used to modify the control parameters (shown by the dashed lines).

To better illustrate the C-OODA Loop perturbations that may be used to enable a consumer to jump or overcome the "uncanny valley," the following methodology is provided as To better illustrate the C-OODA Loop perturbations that are used to enable consumer to jump "uncanny valley," the following example is provided:

1.0.A. False audio/video signal is emitted.
1.0.B. Close observation is initiated.
1.1.1. Detection of audio/video input is avoided.
1.1.1.1. Coverage area is evaded (spatial & temporal) by:
  a. Calculating gaps within the coverage unacquainted, or ignored area.
1.1.1.2. Audio/video input is made invisible by decreasing S/N ratio (decreased S &/or increased N) below detection threshold.
1.1.1.2.1.A. Operation below absolute sensitivity threshold is used.
  B. Sensitivity decrease is designed by:
  a. Adjustment.
  b. High intensity stimulus at boundaries of area of interest.
  c. Super saturation.
  C. Illumination is deflected so object is not illuminated.
  D. Illumination is deflected so it is not returned.
  E. Object is transparent.
  F. Signal strength is changed (e.g., increased) to misrepresent source characteristics (size & distance).
1.1.1.2.2. Process is masked (or "jammed") with:
  a. noise through speakers.
  b. or other stimuli:
  aa. Large deliberate motion to cover smaller secret movement.
  bb. Swift deliberate motion to cover slower secret movement.

1.1.1.3. Limited memory buffer capacity is used e.g.:
  a. Spatial awareness is targeted with sound so it can't detect the presence of a second object.
1.1.1.4.1. Spatial discriminability limit is used by:
  A. Blending with a background.
  B. Moving several objects closer together so they appear to be only one.
  C. Utilizing spatial resolution limits (e.g., depth perception).
1.1.1.4.2. Temporal discriminability limits are utilized. (e.g., tracking or focusing time, observation sampling time)
1.1.1.1.A. Signal is degraded to decrease accuracy of feature perception.
1.1.1.2.A. Inaccuracies are induced in perceptual processes for obtaining standards for positive/negative feedback e.g.:
  a. constancy expectancy is made to produce distortions of color, size, distance, form, angles, disrupted direction; e.g., size illusion induced by comparison.
  b. systematic errors in extrapolation of perspective are used to induce of shape or orientation
  c. spatial context to induce size changes is utilized.
  B. Sensory data to fill in for missing or unclear data is calculated by:
  a. cause failure of the process.
  b. using illusions caused by ambiguous perspective.
  C. Dissimulating something (e.g., object, capability, etc.) which is present (Controlling detectable stimuli to be compatible with the absence of something and apparently incompatible with its presence) by:
  a. blending with another signal Obscured boundaries (disruptive patterns; countershading)
  b. signal blending with background.
  c. background blending with signal.
  d. a new, apparently random pattern (that is not yet learned).
  e. simulating of something which does or doesn't exist (dummies, duplicates, positions & motions.)
  D. Controlling something which does or doesn't exist (dummies, duplicates, positions & motions, impersonation) by:
  a. simulation of unimportant objects.
  aa. masking as one of many objects.
  b. simulation of unimportant objects.
  aa. simulating hidden objects.
  bb. providing inputs and outputs to induce the existence of structure, content, or processes
  cc. simulating something a fake which is disposable or easily hidden
  E. Substitution/switching one object for another is controlled by:
  a. presenting faked object for real; or defective objects for quality ones (e.g., spare parts)
  F. Features are changed often (substitutes) to prevent learning which features belong to the pattern.
1.1.1.3.A. Sensory imbalance is induced by selective cognitive fatigue.
  B. Sensory imbalance is induced by cognitive sensory deprivation by:
  a. disorientation of all or part of the cognitive system by denying sensory feedback/stimuli.
  C. Loss or distortion of spatial reference is induced.
  D. Loss or distortion of temporal reference is induced (e.g., loss or distortion of sense of time under intense activity).
  E. Perception of opposite characteristic is induced by contrast effects e.g.:
  a. color contrast;
  b. brightness contrast (brightness)

Situation awareness (SA) may be utilized as a measuring method during audio/video perturbations using C-OODA loop to measure extent of positive and negative feedback that is determined by consumer's perception responses. Situation awareness (SA) has been described as the complete understanding of factors that will contribute to the optimal performance of a task under expected and unexpected conditions. Externally paced situations, which are temporally driven, require heightened visual attention to preliminary movements and cues. Selectively attending to relevant advanced cues allows individuals to make anticipated decisions as to intentions, which increases the speed of reactions. Quick responses become less important when driving a car on a desolate highway; however, vast differences exist when driving in metropolitan downtown during a rush hour. Attempting to simultaneously attend to or become consumed by all the traffic signs, traffic lights, vehicles, bike messengers, and pedestrians would be ineffective and dangerous, especially when quick decisions must be made. Equally ineffective and dangerous would be narrowing one's attention field to the point of becoming consumed by only one singular object, such as the car directly in front of you. For situation awareness to be effective, situational assessments must actively access coherent conceptual representations, since each experience expands an individual's current knowledge base while influencing the acquisition and interpretation of new knowledge.

The Situation Awareness Global Assessment Technique (SAGAT) is a global computerized tool developed to assess SA across all of its elements based on a comprehensive assessment of operator SA requirements. Using SAGAT, a simulation employing a system of interest is frozen at randomly selected times and persons are automatically queried as to their perceptions of the situation at that time. The system displays are blanked and the simulation is suspended. As a global measure, SAGAT includes queries about all SA requirements, including Level 1 (perception of data), Level 2 (comprehension of meaning) and Level 3 (projection of the near future) components. This includes a consideration of system functioning and status as well as relevant features of the external environment.

SAGAT queries allow for detailed information about subject SA to be collected on an element by element basis that can be evaluated against reality, thus providing an objective assessment of persons SA. This type of assessment is a direct measure of SA; it taps into the perceptions. Furthermore it does not require persons or observers to make judgments about situation knowledge on the basis of incomplete information, as subjective assessments do. By collecting samples of SA data in this manner, perceptions can be collected immediately. As subjects cannot prepare for the queries in advance, they could be queried over almost every aspect of the situation to which they would normally attend.

The SAGAT technique has thus far been shown to have a high degree of validity for measuring SA as well as to have predictive validity. Empirical validity has been demonstrated through several studies which have shown that a temporary freeze in the simulation to collect SAGAT data did not impact performance and that such data could be collected automatically.

When faced with a problem, an individual forms a list of all different options and possible outcomes, and then uses logic in its best sense to perform a cost/benefit analysis that will provide him/her with the best possible choice. When confronted with a situation that requires a decision, an individual compares it to similar situations that have been encountered in the past (e.g. personal traits), and tends to act accordingly.

Emotions represent different families of related affective responses, for example Fright, Fear, Terror, and Panic. Each member of an emotion family shares certain mechanisms and characteristics, including similarities in antecedent events, expression, likely behavioral response, and physiological patterns. These characteristics differ between emotion families, distinguishing one from another. In certain computational models explicit models for six different emotion families: Anger, Fear, Distress/Sadness, Joy/Happiness, Disgust, and Surprise may be used. The selection of this core set of emotion types is not arbitrary, but rather it is based on evidence suggesting their universality, including distinctive universal facial expressions, as well as eight other properties.

Releasers of emotions to be used in current embodiments may be divided in four groups: (1) Neural, which includes the effects of neurotransmitters, brain temperature, and other neuro-active agents that can lead to emotion and which can be mediated by hormones, sleep, diet, and environmental conditions; (2) Sensorimotor, which includes sensorimotor processes, such as facial expressions, body posture, and muscle action potentials that not only regulate ongoing emotion experiences but can also elicit emotion; (3) Motivational, which includes all motivations that lead to emotion, and which include drives (e.g., Thirst and Hunger), emotions (e.g. Anger, and Happiness), and pain regulation; and (4) Cognitive, which includes all types of cognitions that activate emotion, such as appraisal of events, comparisons, attributions, beliefs and desires, and memories.

A PEACTIDM algorithm may be used during manipulation of a consumer's emotions in the course of establishment of the VRPE as well as during its existence to move the consumer toward purchasing excitement and enable him/her to overcome the "uncanny valley." PEACTIDM provides the computational structure needed to establish positive and negative feedback during C-OODA loop perturbations of set parameters. Further, to move the consumer toward purchasing excitement, a consumer's traits are used to move the consumer emotionally during the course of the VRPE experience. A personal trait is a stable, cross-situational individual difference. Although traits are not changeable, relations between traits are. Thus, the VRPE uses relationships between a consumer's traits to create emotions and move the consumer toward a state of purchasing excitement.

FIG. 8 provides an overview of various relations between consumer's traits that lead to purchasing excitement 817. When a state of purchasing excitement is reached via cognitive stimulus utilized in this invention, an individual's observance becomes unfocused to the point that will overcome the "uncanny valley" effect, and allow for a successful virtual reality purchasing environment (VRPE). The relationships between the various elemental, compound and situational traits are illustrated with arrows. For example, if an individual's emotions associated with a need for arousal 810 or need for material 811 are stimulated then an increase in buying impulsiveness 816 will occur. The present invention uses an understanding of these relationships to increase consumer's buying impulsiveness which leads to purchasing excitement 817. The following traits relationships may be utilized in the C-OODA loop in accordance with one or more embodiments of the present disclosure.

Openness to experience 805 is positively associated with innovativeness 812. Openness to experience is comprised of six facet traits: fantasy, aesthetics, feelings, actions, ideas, and values. While values refer to the readiness to re-examine traditional social, religious, and political values, ideas can be defined as the tendency to intellectually curious and open to new ideas. Extraverts tend to enjoy human interactions and to take pleasure in activities that involve large social gatherings. Introversion is negatively associated with innovativeness 812. In turn, innovativeness is positively associated with propensity to trust 814. Openness to experience 805 is also positively associated with need for cognition. People high in need for cognition demonstrate a willingness to engage in effortful cognitive activity. Relationship between need for cognition and conscientiousness reflects the motivation to engage in concerted thought.

Conscientiousness 808 is positively associated with need for cognition 813. The amount of information available online can make information-seeking a difficult task. Consumers with high need for cognition 813 may be inclined to shop online because of the information-rich environment, while low-NFC persons avoid engaging in such Cognitive demanding shopping tasks. Agreeableness 806 is positively associated with propensity to trust 814. Neuroticism 809 is negatively associated with propensity to trust 814, but Neuroticism is positively associated with buying impulsiveness 816, while conscientiousness 808 is positively associated with value consciousness 815.

Need for material 811 is the need to collect and possess material goods and is identified as an elemental trait from evolutionary psychology perspective. It also is negatively associated with Value Consciousness 815. Need for material is positively associated with buying impulsiveness 816. The sheer volume of information available on the Web can make information-seeking a cognitively challenging task. Person high in a need for cognition demonstrate a willingness to engage in effortful cognitive activity.

Need for arousal 810 is positively associated with buying impulsiveness 816. Materialism and money spending attitudes are related to impulse buying. Those who have higher materialism scores are also high on impulse buying. Materialism is a construct similar to need for material. Consumers higher in need for material disposition tend to act more impulsively in a buying condition.

Innovativeness is positively associated with online purchase intention. Innovativeness is degree to which an individual is receptive to new ideas and makes innovative decisions. Tolerance for novelty and tolerance for complexity significantly impact innovativeness. A person high in a need for cognition demonstrates a willingness to engage in effortful cognitive activity. Need for cognition is positively associated with online purchase intention. Trust in Internet security and the integrity of online vendors' poses as a central issue in online consumer behavior.

Tuning to Situational Traits 803 and propensity to trust 814 are positively associated with online purchase intention 817. Besides information from vendors about availability of products and services, consumers spent most of their time making price comparisons online. Internet has lowered the purchase prices for consumers who are using it as product information source. Since price is one of the major impetuses for online purchases, consumers who are more conscious of value should turn to the Internet as the shopping channel providing the best deal. Likewise, value consciousness 815 is positively associated with online purchase intention. Finally, buying impulsiveness 816 is also positively associated with online purchase intention 817. Impulsive buying is higher online compared to in-store shopping because consumers are less inhibited while shopping online. Understanding the linkage between the elemental, compound and situational traits and the surface trait of purchasing excitement 817 allows for the successful creation and modification of a VRPE using audio and video perturbations.

Referring now to FIG. 9, a flow chart illustrating a perturbation analysis method 900 in accordance with one or more embodiments disclosed herein is shown. The perturbation analysis method generally includes the following method steps. The consumer is mapped to a prospective perturbation path based on specific consumer information and/or general customer information 901 stored in one or more databases 911. A virtual environment delta (change) is selected using a perturbation database 912 that is driven from consumer data and/or random selections 913 of possible perturbation trees 902. The virtual reality purchasing environment (VRPE) delta is applied to the virtual reality purchasing environment (VRPE) 903. A consumer response to the new VRPE is measured and recorded 904. It is then determined whether the expected consumer response is positive or negative 905. If the expected consumer response is negative 906, a negative context correlation between the VRPE delta and the consumer is recorded and a gradient path assumption for the consumer is reversed 909. If the expected consumer response is positive 906, a positive context correlation between the VRPE delta and the consumer is recorded and the gradient path assumption for the consumer is reinforced 909. Finally, the perturbation tree and consumer response results are recorded to the main database, and the process may start over.

Figure 10A:
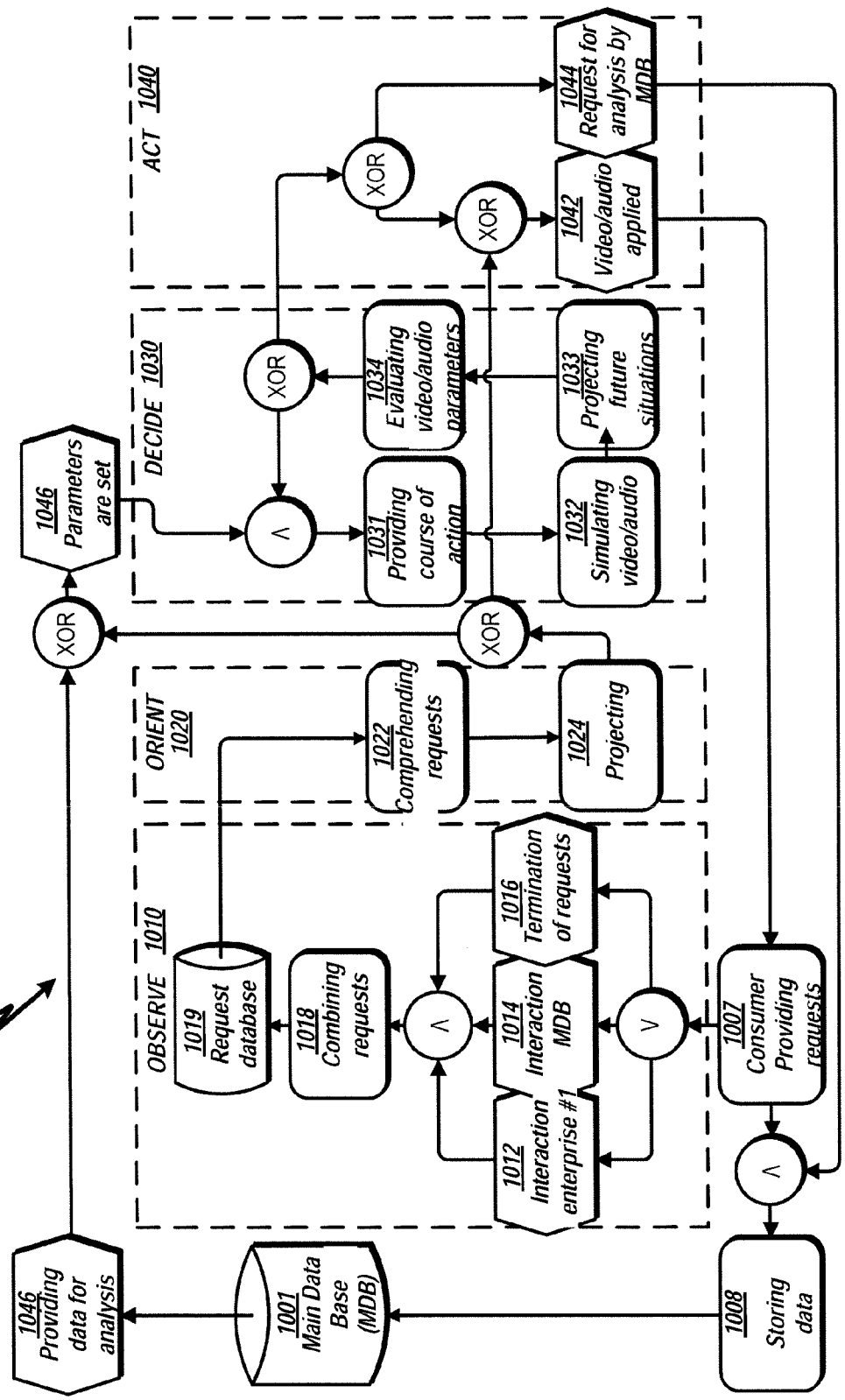
FIGS. 10A to 10E illustrate a control methodology that controls the stimulus experienced by the consumer control methodology in accordance with one or more embodiments of the present disclosure.
Figure 10B:
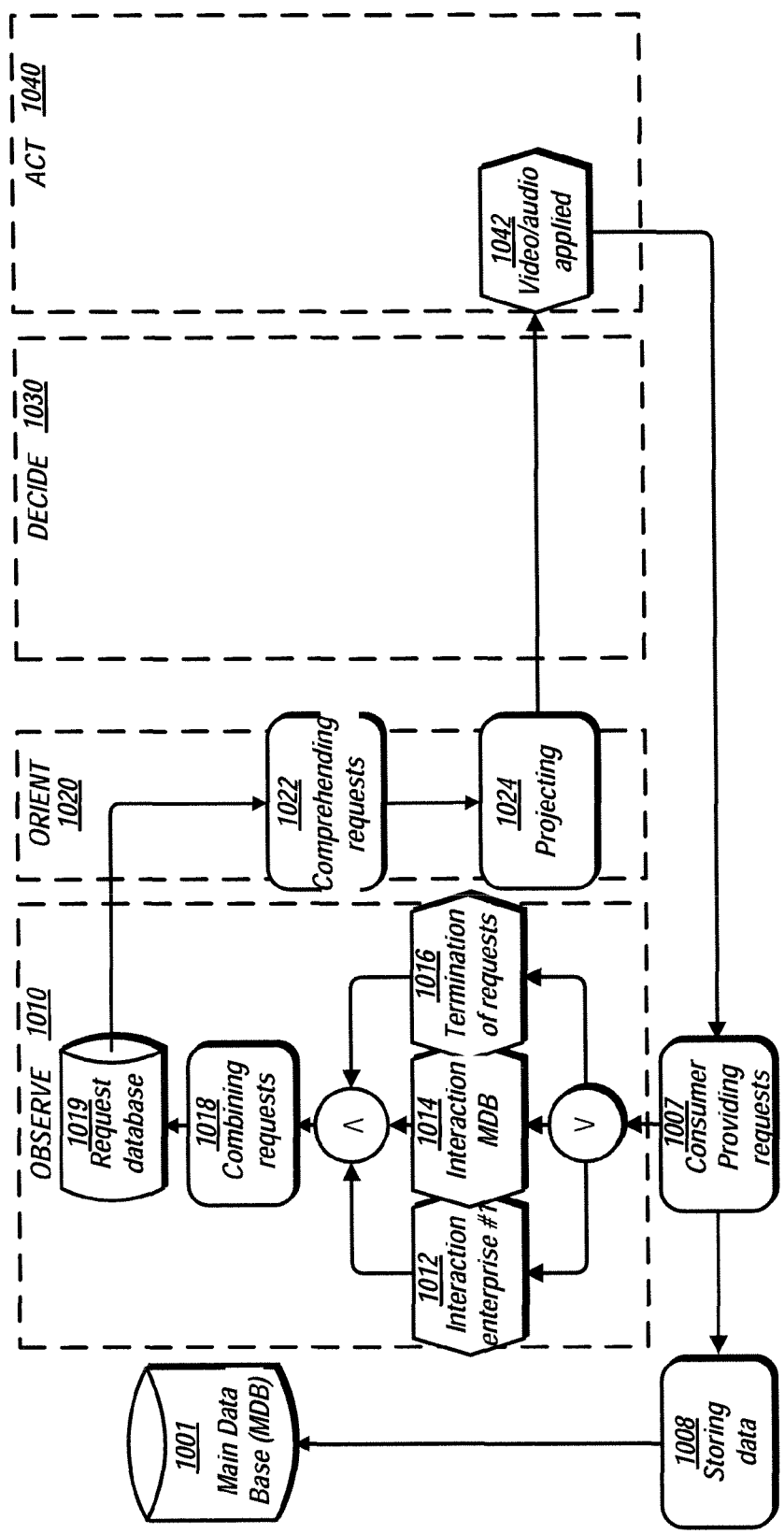
Figure 10C:
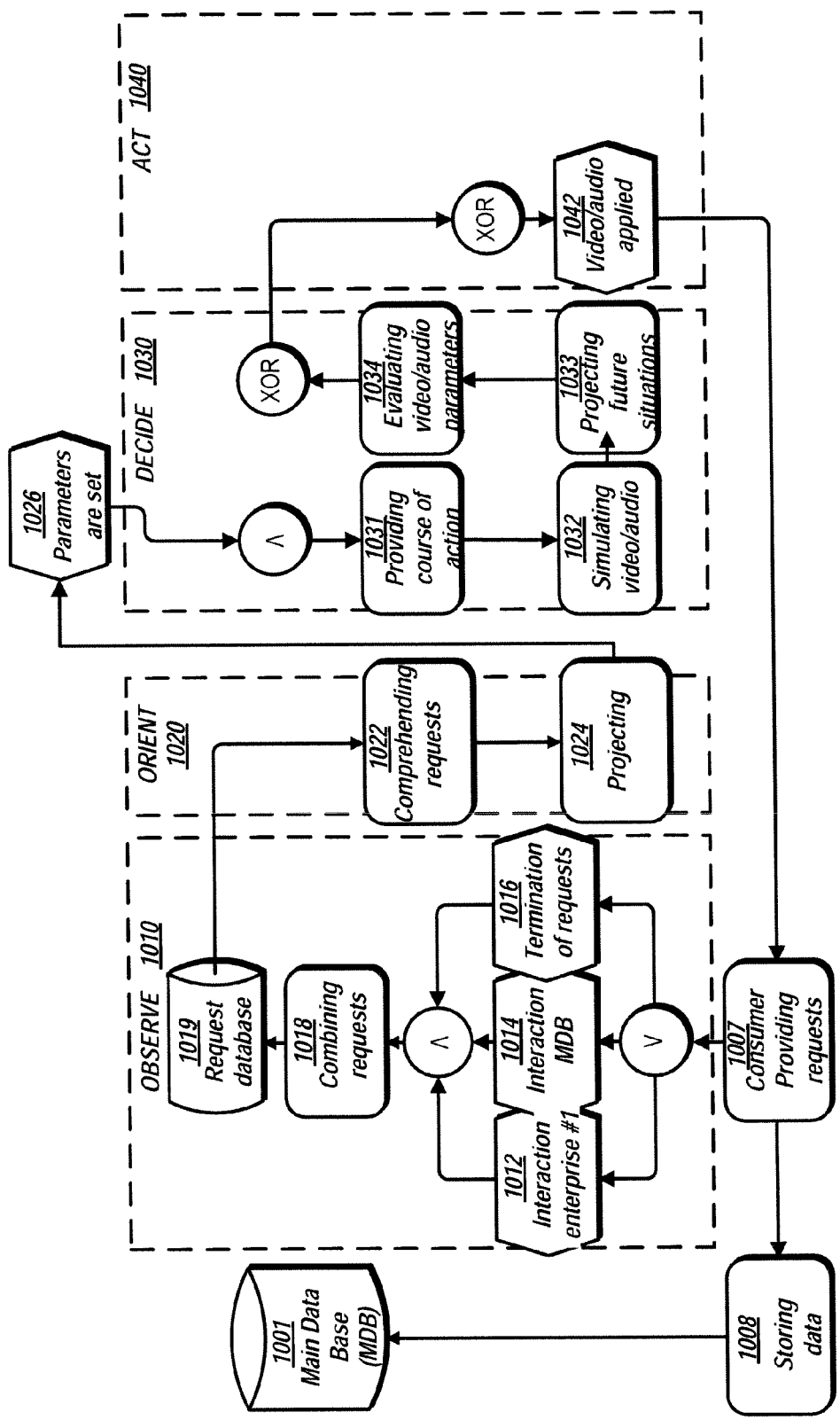
Figure 10D:
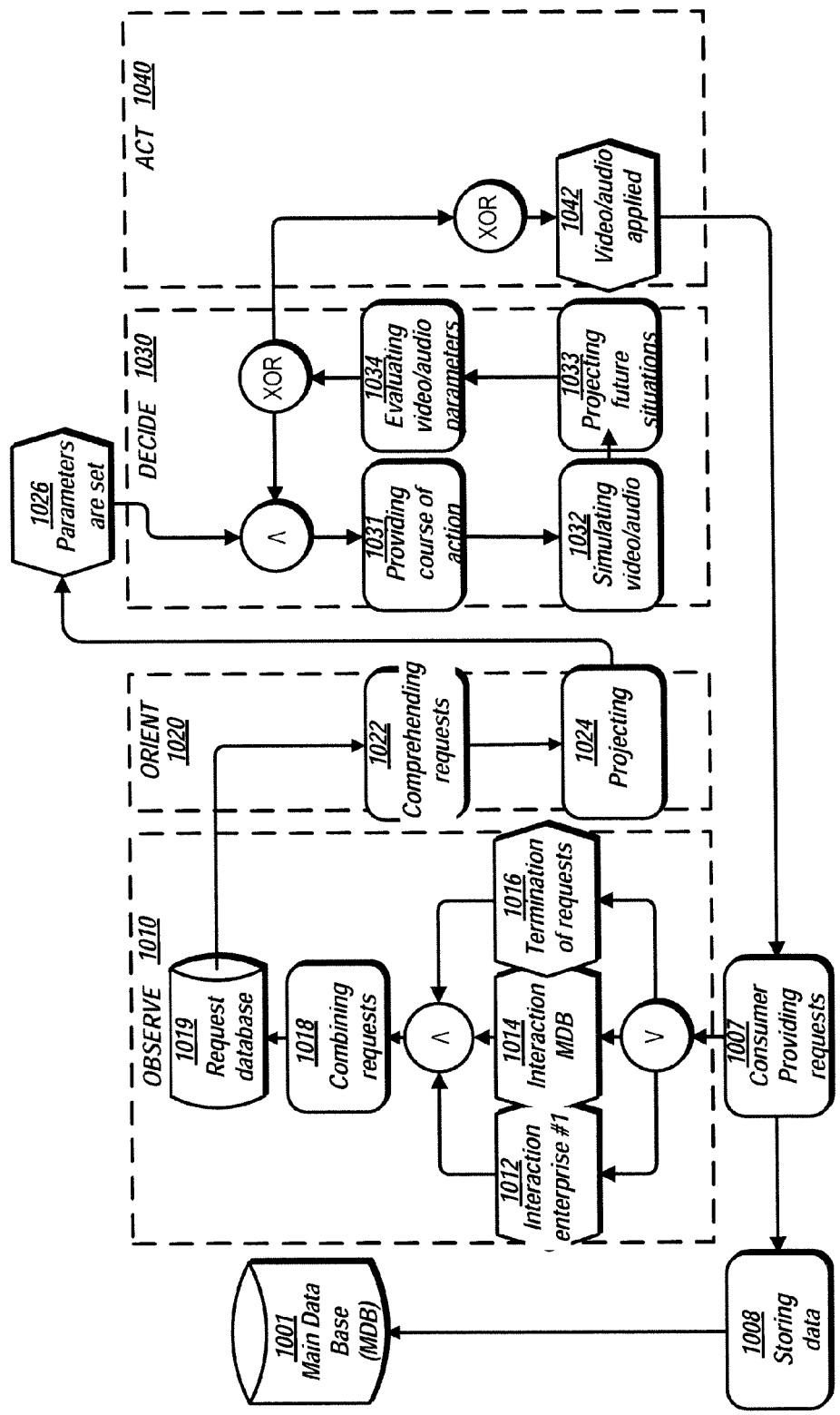
Figure 10E:
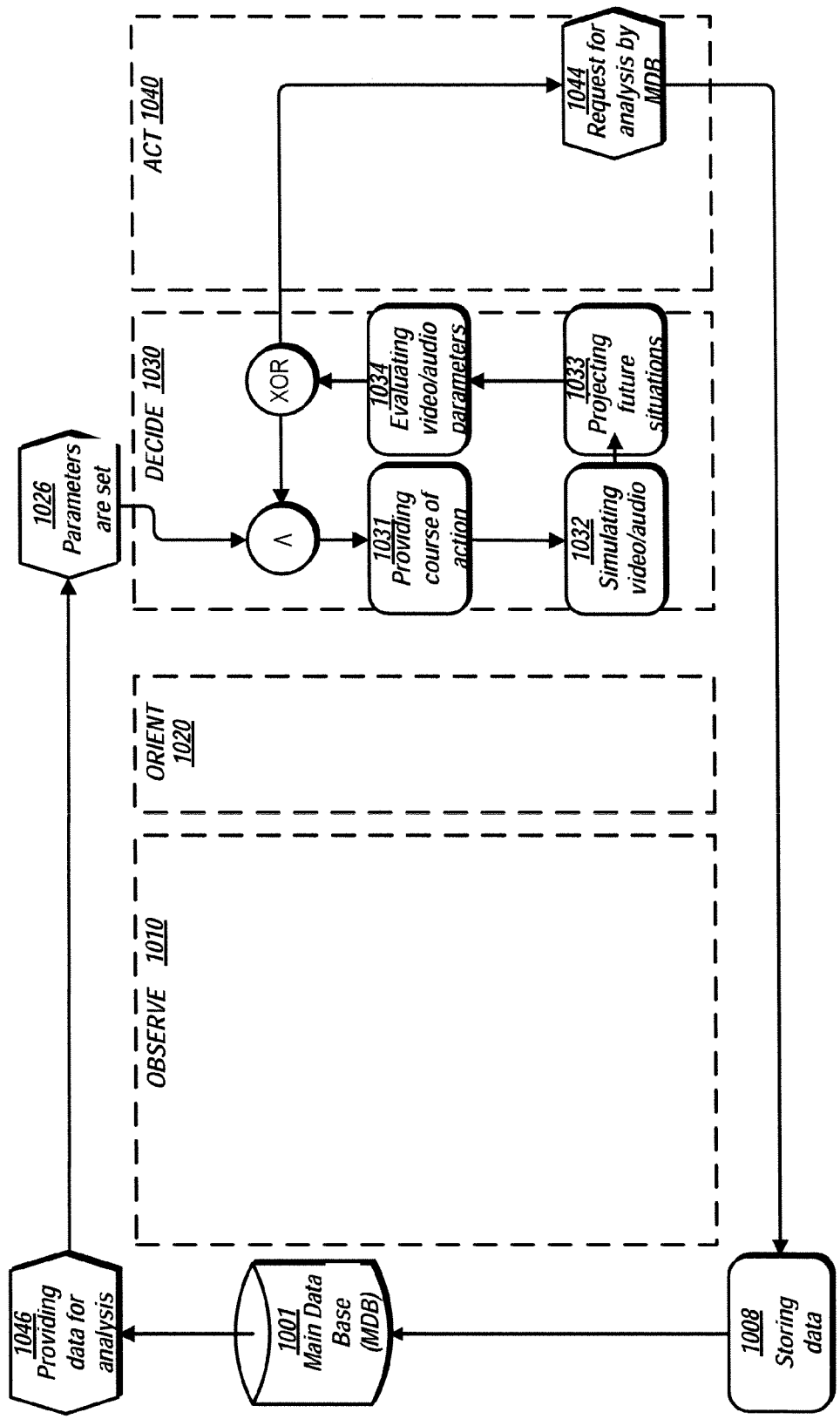

For a consumer to enjoy the VRPE, a control methodology may be employed that controls the stimulus experienced by the consumer. Embodiments disclosed herein may use a C-OODA loop configuration 1000 as generally illustrated in FIG. 10A. The C-OODA loop 1000, in accordance with embodiments disclosed herein, includes four components: Observe 1010, Orient 1020, Decide 1030, and Act 1040. A main database 1001 contains both transaction data as well as consumer intelligence. For purposes of this disclosure, transaction data may include, but is not limited to, transaction data relating to (i) business interactions between a consumer and a business enterprise involving an exchange of goods and/or services, (ii) potential business interactions between a potential consumer interested in a good and/or service and a business enterprise with or without an exchange of goods and/or services, (iii) non-business interactions by a potential consumer with a business enterprise (e.g., window-shopping or browsing), (iv) business interactions or potential business interactions conducted between two or more business enterprises, and (v) other possible business or non-business interactions between consumers, potential consumers, and business enterprises, and between two or more business enterprises. FIGS. 10B, 10C, 10D and 10E represent the logic flow for increasingly complex consumer requests. In sum, FIG. 10B represents the "simple match" logic flow, while FIGS. 10C and 10D represent the "diagnosis" logic flow, and FIG. 10E represents the "evaluate course of action" logic flow. The detail for each element in FIG. 10A will be discussed while working through the logic of FIGS. 10B to FIG. 10E.

Referring to FIG. 10B, an initial shopping request 1007, provided by a consumer, originates in the Observe component 1010. The consumer request data is stored 1008 in the main database 1001 and passed to an enterprise 1012 providing goods or services and wanting to fulfill the consumer's request. The enterprise uses the initial or first request to create the VRPE, but may combine multiple consumer requests 1018. If the first enterprise does not or cannot participate in the creation of VRPE, then the main database 1001 may take over 1014 and create the VRPE so that the consumer is never left without the VRPE experience. The consumer requests may be stored in a Request Database 1019, which may be owned by the enterprise and improved in real time by buying consumer intelligence from the MDB 1001.

If the initial consumer request is simple, the enterprise may be able to easily comprehend the request 1022 and then project the VRPE 1024 in the Orient component 720 of the loop. During the "simple match" decision process shown in FIG. 10B, there is no need for the processes used in the Decide portion, namely recalling and evaluating. Based on the comprehended request 1022, certain parameters may be set 1026 for the audio and video stimulus used in the VRPE and a course of action is established 1031. Then, the VRPE is created and audio and video parameters are applied 1042 in the Act component 1040 of the loop. In this simple match logic flow, there is generally no request made to the main database 1001 for any additional intelligence to understand the request or to modify the VRPE. However, cognitive data from the consumer in the VRPE may be stored in the main database 1001.

Once the video and audio parameters are applied, the system waits for another request by the consumer. If one arrives, the loop is repeated. If not, the consumer may terminate the shopping experience 1016. Alternatively, in the event that an enterprise is unable or unwilling to provide the VRPE to the consumer, then the administrator of the main database 1014 may be called on directly to provide the VRPE. Indeed, to keep a consumer from terminating the shopping request 1016, the main database may act as a backstop to ensure that the consumer is satisfied.

FIG. 10C illustrates the C-OODA loop logic used for a more complicated request. For example, a consumer may be interested in planning a wedding on a beach in anywhere in the world. The consumer may like to visualize the beach, the music that might be played, and the clothing worn by the bridal party, among others. To feel comfortable with the purchase decisions, a VRPE may be created that allows the consumer to see himself/herself on that beach in the perfect dress. As shown in FIG. 10C, the Observe and Orient components may be identical to those shown in the simple match example in FIG. 10B. If enough data is provided, then initial parameters for the VRPE may be set 1026. Parameters may be evaluated to determine a course of action 1031, and audio and video effects are simulated 1032 and future situations are projected 1033. In addition, the audio and video parameters are evaluated 1034 to determine if they are suitable for the VRPE. If not, the decision loop is repeated. If the audio and video are adequate, then the parameters may be applied 1042. In this instance, no data is retrieved from the main database during the decision cycle.

Back to the earlier example, an image of a beach is chosen for projection 1033 for the consumer on a screen or perhaps a head-worn display unit. At first, there might be silence or simply the sound of the wind or waves. A choice of music, perhaps wedding music or other music, only occurs later. However, if the decision involves a complex situation, the decision loop may cycle several times before an action occurs. The audio and video parameters may be evaluated 1034 further based on an analysis of future situations 1033. If a satisfactory decision is made, then the video/audio parameters may be applied 1042 as given in the above example. FIG. 10D illustrates repeating the loop in the Decide component 1030. As the decision loop is iterated, even more sophisticated cognitive data may be obtained and stored in the main database 1001.

However, in a third scenario, the decision cycle may be too complex and require more information or take more time than is available to the enterprises participating in the VRPE. In this instance, a request may be made to the main database

1001 for additional information to successfully create the VPRE. FIG. 10E provides the logic used in this "evaluate course of action" scenario. To simplify the illustration, the detail inside the Observe 1010 and Orient 1020 components is removed because the components are the same as those shown in previous figures. However, like the scenario discussed in FIG. 10D above, the decision loop has made numerous iterations to determine if it has enough information to construct the VRPE and perturb it as needed. If the decision cycle is taking too long, or simply lacks the needed data, a request 1044 may sent to the main database 1001. Additional information 1046 is provided and the decision 1030 cycle begins again. Each enterprise must decide at what point it is willing to send for (and pay for) additional external data from the main database. When the main database 1001 is queried for additional information, the VRPE may be more successful in keeping the consumer engaged. The more time the consumer is engaged in the VRPE, the more sophisticated the cognitive data is that is retrieved from the consumer and stored in the main database 1001. Thus, whenever the consumer visits the VRPE again, all of the data from his or her earlier visits may be available for purchase by the enterprises attempting to sell goods or services, and the quality of the cognitive data continues to improve.

Figure 11:
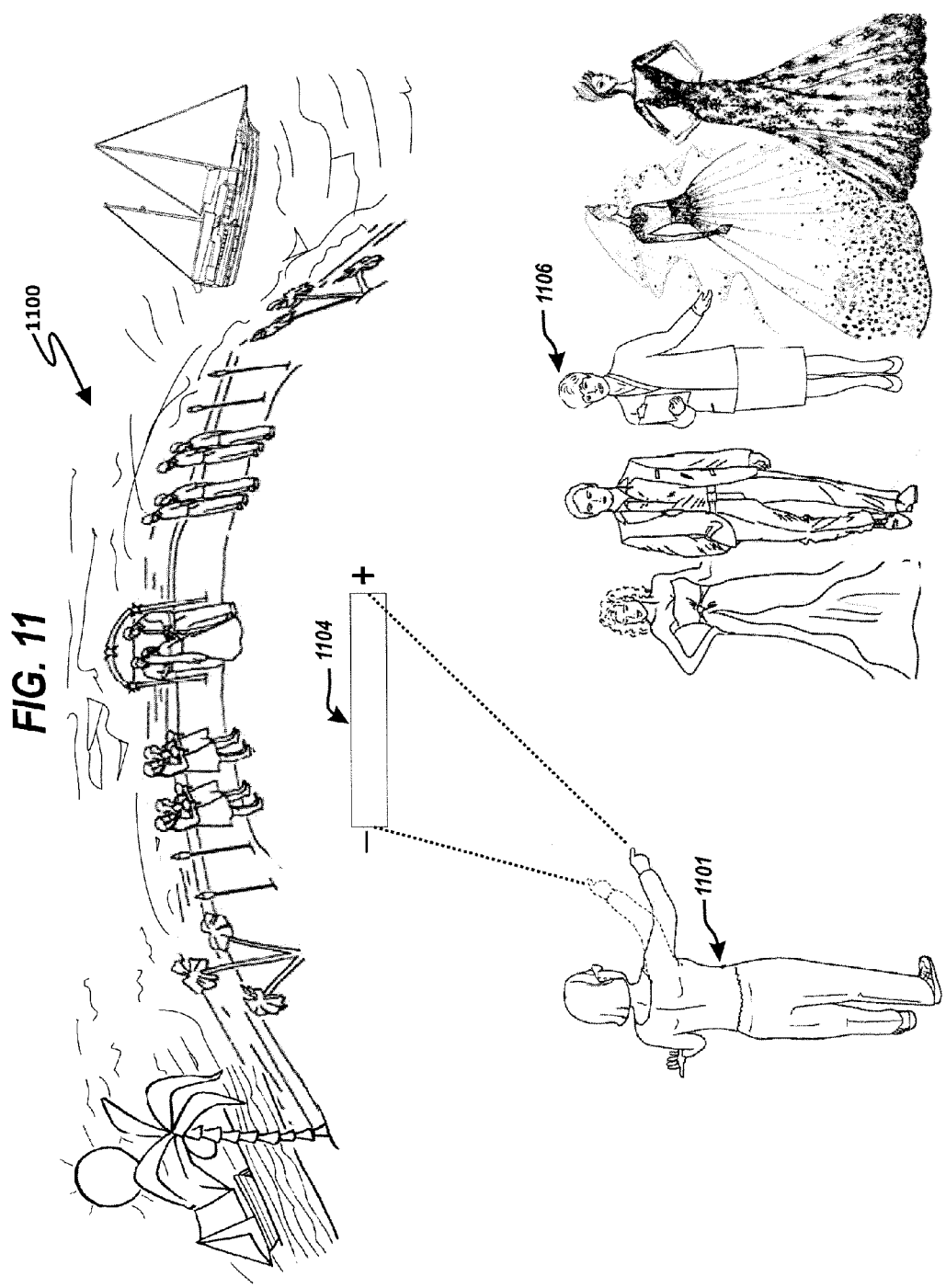
FIG. 11 illustrates a tangible embodiment of the VRPE that allows the consumer to gauge his/her reaction to the modifications of the virtual environment in accordance with one or more embodiments of the present disclosure.

While embodiments disclosed herein may incorporate a wide variety of methodologies to provide consumer feedback into the perturbation control subsystem described herein, one exemplary implementation of this is generally illustrated in FIG. 11. Here the consumer 1101 may virtually gauge his or her reaction to the modifications of the virtual environment by modulating a "virtual volume control" 1104 that ranges from a highly negative response to a neutral response to a highly positive response. Modulation may be implemented using hand/arm movement detectors or the like with video and/or handheld accelerometer measuring devices, or other types of modulators as will be known to one of ordinary skill in the art.

This type of consumer feedback may generally be considered "active" in that it requires active feedback from the consumer to gauge the consumer's response to the changes in the virtual environment. Also possible in this context is "passive" feedback, also known as situational awareness that may be obtained from heart rate monitors, blood pressure monitors, facial expression evaluators, eye movement detectors, hand/arm position monitors, posture evaluators, and the like. Any of these response indicators may be used to gauge the consumer's feedback to the changes in the VRPE, with this information used to both provide additional information on how the VRPE should be modified but also used to classify the consumer and provide insight into the consumer's behavioral characteristics. In this example, a sales consultant 1106 may join the consumer 1101 in the VRPE.

Figure 12:
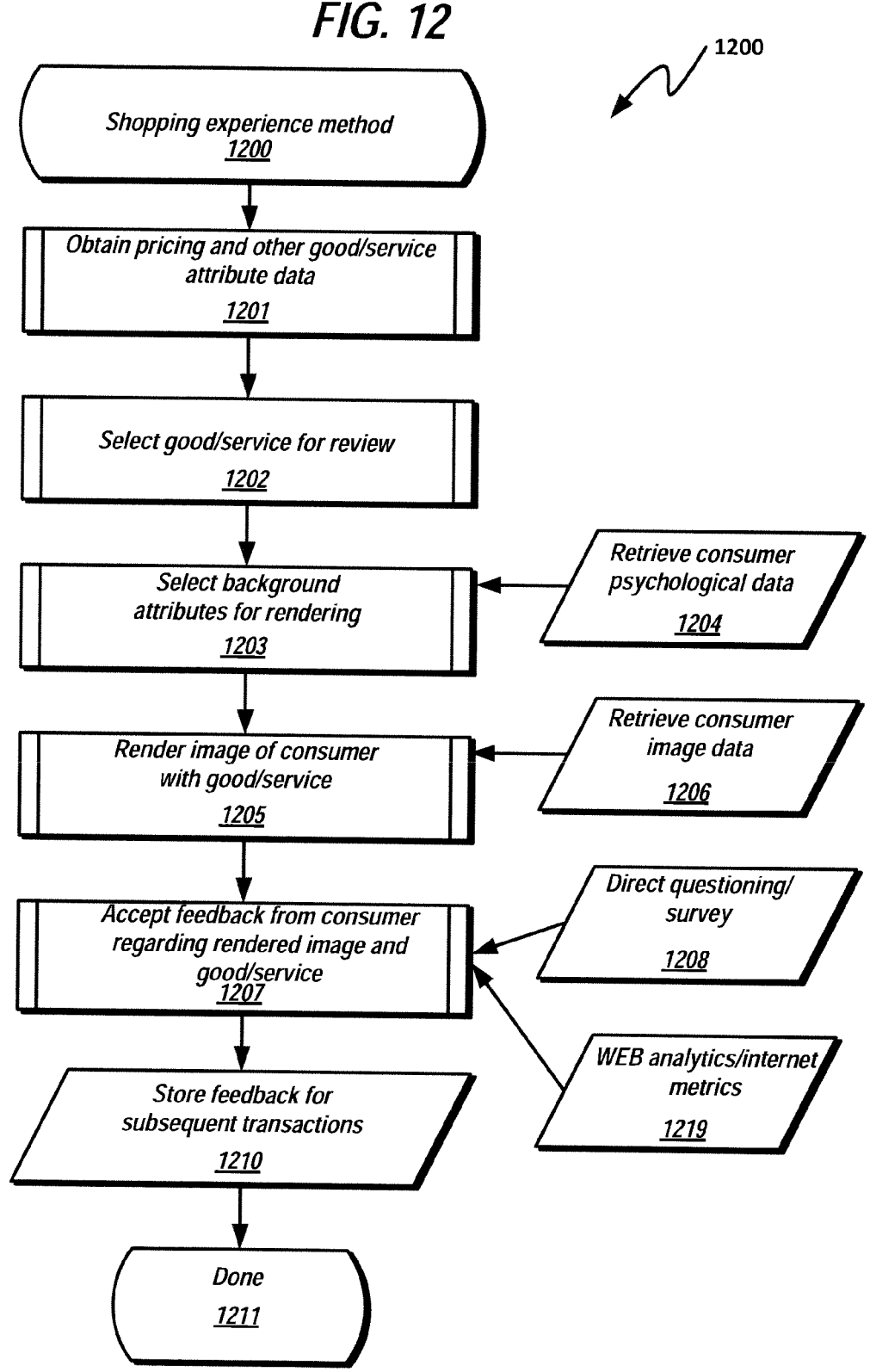
FIGS. 12 and 13 provide flow charts of the logic used during a shopping experience within the VRPE in accordance with one or more embodiments of the present disclosure.

FIG. 12 illustrates a flow chart of logic used during a consumer's shopping experience within the VRPE in accordance with one or more embodiments of the present disclosure. As depicted in this figure, the virtual reality purchasing experience 1200 in this embodiment begins with the consumer obtaining pricing and other attribute data related to a good and/or service 1201. The consumer obtains this information through some means with a web browser capable of accessing the enterprise cloud and the system database. For example, the user may instantiate a web browser or other addressable user interface on his or her computing device to access the website of a seller in the enterprise cloud. The consumer views the seller enterprise's offerings of goods and/or services, and then makes a selection for further review 1202.

Upon consumer selection, the seller accesses the system database to obtain consumer intelligence (psychological) data 1204 representing the exact consumer. A background image is determined based on the consumer intelligence data and in view of the good/service selected, and the background scene is rendered 1203 in the consumer's browser. Previously stored consumer image data is also obtained 1206, and an image of the consumer is rendered within the background scene 1205, with the consumer appropriately wearing or using the good or service being considered.

The depicted system embodiment prevents drop into the "uncanny valley" by rendering a scene that elicits positive or negative emotions from the consumer. In order to achieve this, the scene is chosen based upon the psychological data obtained from the consumer intelligence data that was previously mined from available sources. The scene that is rendered may also include audio that aids in eliciting positive or negative emotion. For example, it may have been determined from the consumer intelligence data that the consumer, who happens to be considering the purchase of a new swimsuit, is enamored with the ocean and is planning a trip to the pacific coast. Further, it may also be determined that the consumer is an environmentalist that has been quite active in issues involving marine life. Thus, from this consumer intelligence data the scene chosen may be that of a picturesque sandy, yet rocky, beach with several sea lions basking in the sun on distant rocks. Audio that includes the sounds of the wind and surf moderately crashing on the rocks, with occasional, low barking sounds of sea lions in the distance may accompany the scene as explained in the above example of the wedding on the beach. Also, the rendered image may be static or may be animated. Finally, by rendering a three-dimensional image of the consumer wearing the selected swimsuit on the rendered beach, the overall rendered image elicits positive emotions from the consumer and avoids the "uncanny valley" as previously described, and allows the consumer to enjoy an immersive virtual reality as opposed to simply virtual space. Thus, influenced by these positive emotions, it is highly likely that the consumer will likewise feel positively about the good (e.g., the swimsuit) and will make the purchase.

In the depicted system embodiment, the system database obtains the good/service data from the seller and combines this with the aforementioned consumer intelligence data to render the chosen scene. However, in another embodiment, the seller website obtains the aforementioned data and utilizes its own hardware to render the chosen scene. In yet another embodiment, the chosen scene may be rendered by a third-party that is provided the necessary consumer intelligence data and good/service data. In still another embodiment, a combination of the seller, system database, and third-party provider may be used.

Feedback from the consumer regarding the image is also obtained 1207. This feedback includes possible direct questions asked of the consumer 1208 as well as web-based analytics or other Internet metrics 1209. These additional sources of immediate data are then added to the database for subsequent consumer transactions requiring consumer intelligence data 1210. The web-based analytics and metrics 1209 may include all of the web information (e.g., click through, mouse-over, hyperlink selection order and frequency, link duration, etc.) available for processing over the network. Such immediate information assists in maintaining accurate, up-to-date information regarding the particular consumer, and assists in keeping the consumer intelligence data fresh in essentially real-time.

Figure 13:
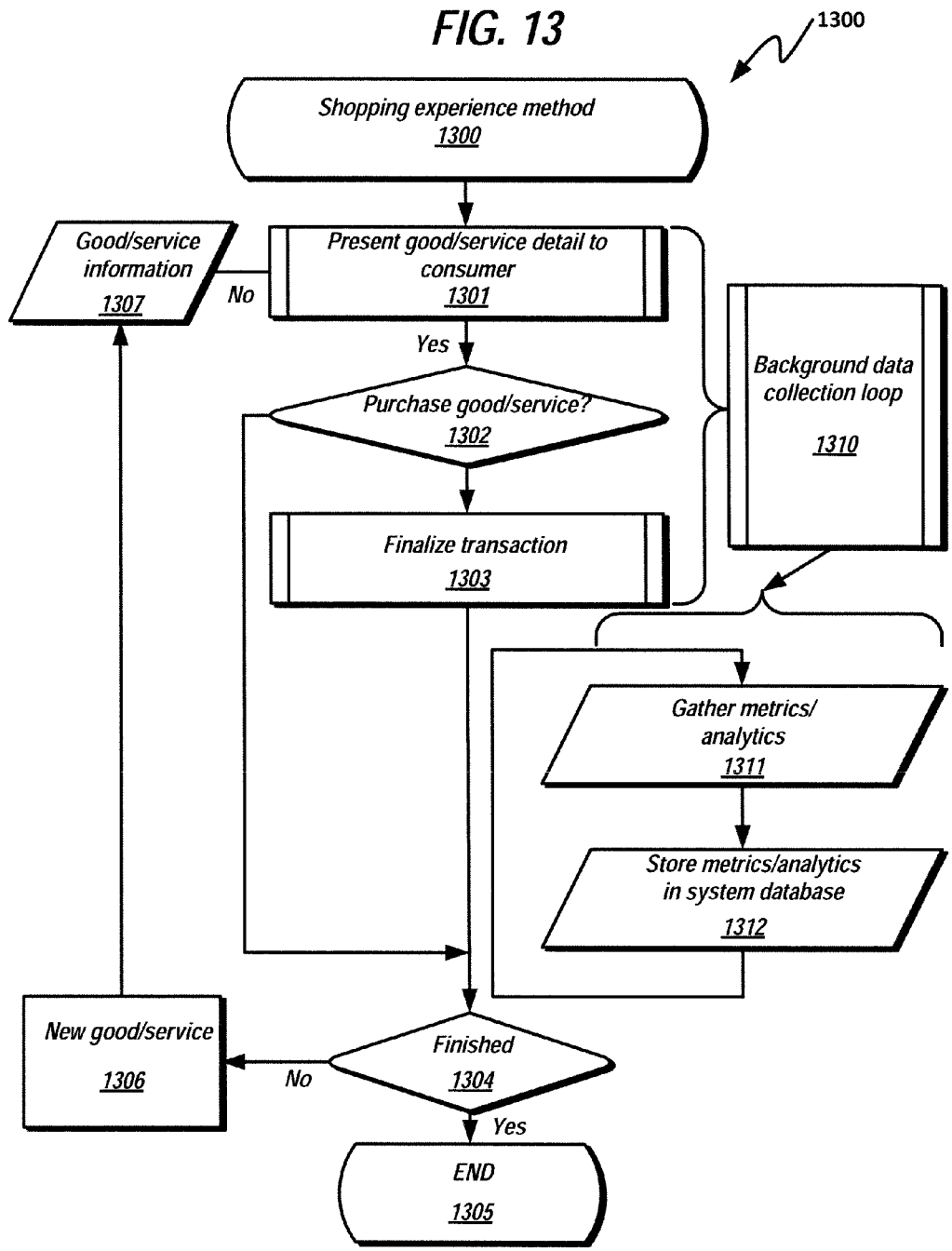

FIG. 13 depicts a flow diagram 1300 of actions taken with regard to a consumer purchase of a good or service, and is another source of data for consumer intelligence data in accordance with one or more embodiments of the present disclosure. The consumer is presented on his or her browser 1301 with goods and/or services data 1307. Web metrics and analytics may be obtained 1310 representing the consumer's interactions with the presented data. The consumer makes a decision regarding purchase of the offered good/service 1302 and, if a purchase is desired, the transaction is finalized 1303. This completed transaction data is added to the consumer intelligence data along with the web metrics/analytics 1311. However, if no purchase is desired, an alternate good/service 1306 is chosen 1304 based on the intelligence data at hand and on the consumer's actions within the browser and this new info nation 1307 is presented 1301. Again, this information is, likewise, added to the existing data 1310 and all are stored in the system database 1312. Information collected in this manner, likewise, assists in maintaining accurate, up-to-date information regarding the particular consumer, and assists in keeping the consumer intelligence data fresh in essentially real-time.

FIG. 14 depicts a flow diagram 1400 of actions taken with regard to the sharing of consumer intelligence data among subscribing enterprises in accordance with one or more embodiments of the present disclosure. As previously discussed, enterprises (i.e., sellers) may be encouraged, and in certain embodiments, may be contractually required to, share data with other enterprises. For example, in the depicted preferred exemplary embodiment the enterprises are required to share such data as a term of the agreement to access the system database. As an enterprise gathers information 1401 from sources such as its own pricing information and good/service specifications, it provides this information to other subscribing enterprises 1411. As the providing enterprise continues a transaction with a consumer, it notes whether or not it is able to fulfill the consumer's desires for a good and/or service 1402. If it is able to fulfill the consumer's desire, then the transaction is consummated and consumer transaction metrics/analytics are obtained 1404. This information is then gathered 1401 and shared with other enterprises 1410. If unable to fulfill the consumer's desires, the enterprise may then turn to other enterprises to seek alternate goods or services 1403. These are then presented to the consumer and subsequent metrics/analytics are obtained and added to the gathered information. Ultimately, this information is also added to the system database where it becomes part of the consumer intelligence data 1412. Information collected in this manner, likewise, assists in maintaining accurate, up-to-date information regarding the particular consumer, and assists in keeping the consumer intelligence data fresh in essentially real-time.

Specific Embodiments may include:

1. A method of generating purchasing excitement within a virtual reality purchasing environment, the method comprising the steps of:
   (a) retrieving stored cognitive data from a database wherein at least some of the cognitive data relates to a consumer's emotions regarding a transaction between the consumer and a business enterprise within a virtual reality purchasing environment; and
   (b) modifying the virtual reality purchasing environment using a C-OODA loop algorithm based upon the stored cognitive data to create consumer purchasing excitement.

2. The method of embodiment 1, wherein the C-OODA loop algorithm comprises a simple match decision cycle.

3. The method of embodiment 1, wherein the C-OODA loop algorithm comprises a diagnosis decision cycle.

4. The method of embodiment 1, wherein the C-OODA loop algorithm comprises an evaluate course of action decision cycle.

5. The method of embodiment 1 wherein modifying the virtual reality purchasing environment comprises:
   (a) delivering audio stimuli to the potential consumer through one or more components of the virtual reality purchasing environment; or
   (b) delivering video stimuli to the potential consumer through one or more components of the virtual reality purchasing environment; or
   (c) delivering audio and video stimuli to the potential consumer through one or more components of the virtual reality purchasing environment.

6. The method of embodiment 5 wherein the stimuli are selected based upon the stored cognitive data and stimulate at least one elemental trait, at least one compound trait, at least one situational trait, or a combination thereof.

7. The method of embodiment 1, further comprising executing at least a portion of the method on a non-transitory computer readable medium comprising a computer program.

8. A system for generating purchasing excitement within a virtual reality purchasing environment wherein the system comprises:
   (a) a database configured to store cognitive data wherein at least some of the cognitive data relates to a consumer's emotions regarding a transaction between the consumer and a business enterprise within a virtual reality purchasing environment; and
   (b) a computer program for providing a virtual reality purchasing environment to a consumer via the internet wherein the computer program comprises a C-OODA loop algorithm configured to employ stored cognitive data from the database to modify the virtual reality purchasing environment to create consumer purchasing excitement.

Advantageously, embodiments disclosed herein provide a transparent collaborative environment in which the consumer receives desired goods or services from multiple enterprises by submitting a single request that reaches these different enterprises and/or desired clusters of enterprises. Transparency means that consumers and business enterprises can see all of the underlying details of any transaction. In accordance with one or more embodiments disclosed herein, transparent collaboration may occur between parties using different technology, such as different platforms, operating systems, databases, and related technologies. Transparent collaboration may allow transactions between any business enterprise and/or consumer not known to the other party prior to the transaction, which eliminates the need for prior set-up of transactions. Moreover, transactions between business enterprises may occur through various channels and at any time, even when enterprises manage to locate and consume one another's resources. Still further, transactions may occur between enterprises in far spread and dispersed regions irrespective of geographical and/or geopolitical boundaries or legal frameworks. Transparent collaboration may occur amongst organizations from any industries, thereby supporting multiple transactions, across multiple organizations in various industries, which may occur by submission of a single request. Finally, transparent collaboration may happen amongst organizations that do not have ongoing, pre-determined relationships, communications, or interaction (i.e., no prior contracts or agreements). For example, organizations not known to each other may collaborate through a transparent platform to satisfy a consumer need, and disperse on the completion of that need.

Although the virtual reality purchasing environment is shown with various components, one skilled in the art will appreciate that the VRPE may contain additional or different components. In addition, although aspects of an implementation consistent with the method for gathering and providing consumer intelligence are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the VRPE to perform a particular method, such as methods described herein.

What is claimed is:

1. A method for gathering and providing consumer intelligence, the method comprising the steps of:
   (a) receiving and storing data in a first database relating to a transaction between a consumer and a business enterprise;
   (b) receiving and storing cognitive data in the first database, wherein at least some of the cognitive data relates to a change of a relationship of one or more consumer's traits to create purchasing excitement and wherein cognitive data is collected from the consumer in a virtual reality purchasing environment with a cognitive observe-orient-decide-act (C-OODA loop);
   (c) receiving and storing data in the first database relating to a transaction between two or more business enterprises;
   (d) providing data from the first database to a business enterprise in response to a request for data sent by the business enterprise; and
   (e) providing data from the first database to a consumer wherein the data relates to a transaction between two or more business enterprises.

2. The method of claim 1, wherein the C-OODA loop comprises a request for data from the first database.

3. The method of claim 1, wherein the C-OODA loop comprises a simple match decision cycle.

4. The method of claim 1, wherein the C-OODA loop comprises a diagnosis decision cycle.

5. The method of claim 1, wherein the C-OODA loop comprises an evaluate course of action decision cycle.

6. The method of claim 1 wherein the virtual reality purchasing environment with a C-OODA loop is modified to create purchasing excitement in the consumer.

7. The method of claim 6, wherein modification of the virtual reality purchasing environment comprises:
   providing one or more audio or visual stimuli delivered to the consumer through one or more components of the virtual reality purchasing environment to change the relationship of one or more consumer traits,
   wherein the one or more audio or visual stimuli create purchasing excitement in the consumer.

8. The method of claim 1, further comprising:
   (e) creating a virtual reality purchasing environment with the first database and providing to the consumer.

9. The method of claim 1, further comprising:
   (f) locating a business enterprise with the first database while providing a virtual reality purchasing environment to the consumer.

10. The method of claim 1, further comprising providing data from the first database to the business enterprise upon payment by the business enterprise.

11. The method of claim 1, further comprising providing data from the first database to the business enterprise in real time.

12. The method of claim 1, further comprising executing the method of gathering and providing consumer intelligence on a non-transitory computer readable medium comprising a computer program.

13. A system for gathering and providing consumer intelligence, the system comprising:
   a computer database,
   wherein the computer database receives and stores data relating to a transaction between a consumer and a business enterprise;
   wherein the computer database receives and stores cognitive data, wherein at least some of the cognitive data relates to a change of a relationship of one or more consumer's traits to create purchasing excitement and wherein cognitive data is collected from the consumer in a virtual reality purchasing environment with a cognitive observe-orient-decide-act (C-OODA loop);
   wherein the computer database receives and stores data relating to a transaction between two or more business enterprises; and
   wherein the computer database provides data to a business enterprise in response to a request for data sent by the business enterprise.

14. The system of claim 13, wherein the C-OODA loop comprises a request for data from the first database.

15. The system of claim 13, wherein the C-OODA loop comprises a simple match decision cycle.

16. The system of claim 13, wherein the C-OODA loop comprises a diagnosis decision cycle.

17. The system of claim 13, wherein the C-OODA loop comprises an evaluate course of action decision cycle.

18. The system of claim 13, wherein a virtual reality purchasing environment is modified with a C-OODA loop to create purchasing excitement in the consumer.

19. The system of claim 18, wherein modification of the virtual reality purchasing environment further comprises:
   one or more audio and visual components configured to change the relationships of one or more consumer traits,
   wherein the one or more audio and visual components create purchasing excitement in the consumer.

20. The system of claim 13, further comprising a virtual reality purchasing environment provided to a consumer by the first database.

* * * * *